(12) United States Patent
Unno

(10) Patent No.: US 8,442,731 B2
(45) Date of Patent: May 14, 2013

(54) CONTROL AND TRANSMISSION OF STRADDLE TYPE VEHICLE, AND THE SAME

(75) Inventor: Toshio Unno, Shizuoka (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 1151 days.

(21) Appl. No.: 12/039,681

(22) Filed: Feb. 28, 2008

(65) Prior Publication Data
US 2008/0215217 A1    Sep. 4, 2008

(30) Foreign Application Priority Data

Feb. 28, 2007  (JP) ................................. 2007-049111
Nov. 22, 2007  (JP) ................................. 2007-303411

(51) Int. Cl.
*B60K 17/00*    (2006.01)

(52) U.S. Cl.
USPC ................... 701/52; 701/51; 701/55; 701/56; 180/218; 180/337; 180/338

(58) Field of Classification Search .............. 701/51–56, 701/62; 474/69–70; 477/44, 46, 68; 180/218, 180/230, 337, 338
See application file for complete search history.

(56) References Cited

U.S. PATENT DOCUMENTS

| 5,947,861 | A  | * | 9/1999  | Nobumoto ...................... 477/37 |
| 6,035,735 | A  | * | 3/2000  | Graf et al. ........................ 74/335 |
| 6,086,506 | A  |   | 7/2000  | Petersmann et al. |
| 6,471,619 | B2 | * | 10/2002 | Nanri et al. ..................... 477/52 |

* cited by examiner

*Primary Examiner* — Thomas Tarcza
*Assistant Examiner* — Adam Tissot
(74) *Attorney, Agent, or Firm* — Rabin & Berdo, P.C.

(57) ABSTRACT

A control system for an electronically controlled continuously variable transmission of a straddle type vehicle in which an intentional shift down operation is easily made in an AT mode. An MT mode temporarily selecting section makes the gear change mode selecting section select the MT mode temporarily and makes the gear ratio control section change the gear ratio of the transmission to a gear ratio from among a plurality of predetermined gear ratios that is positioned lower than a current gear ratio when a mode change signal is inputted in AT mode. An AT mode returning section returns the gear change mode selected by the gear change mode selecting section to AT mode when a release signal is outputted after MT mode is temporarily selected by the MT mode temporarily selecting section.

18 Claims, 18 Drawing Sheets

CONTROL AND TRANSMISSION OF STRADDLE TYPE VEHICLE, AND THE SAME

RELATED APPLICATIONS

This application claims the benefit of priority under 35 USC 119 of Japanese patent application no. 2007-049111, filed on Feb. 28, 2007, and Japanese patent application no. 2007-303411, filed on Nov. 22, 2007, which applications are hereby incorporated by reference in their entireties.

BACKGROUND OF THE INVENTION

1. Field of the Invention

The present invention relates to a control and a transmission of a straddle type vehicle.

2. Description of Related Art

In a conventional electronically controlled continuously variable transmission (ECVT), a gear ratio is automatically changed based on a gear ratio map indicating relationships among vehicle speeds, engine speeds (accelerator openings) and gear ratios. Accordingly, vehicles incorporating an ECVT do not require any gear change or clutch operations by a rider. Therefore, ECVTs are incorporated in various vehicles.

In a vehicle incorporating an ECVT, however, a rider cannot optionally change gear ratios from the settings in the gear ratio map. Hence, the rider has difficulty effectively activating an engine brake more strongly than that given by the gear ratio map.

In a vehicle incorporating an ECVT, it is also difficult to make a so-called kick down operation whereby a shift down operation is intentionally made more greatly than normal to increase acceleration of the vehicle, for example, when passing another vehicle.

A vehicle incorporating an ECVT has been proposed whereby both the so-called AT mode, in which gear ratios can be continuously and automatically changed, and the so-called MT mode, in which gear ratios can be changed optionally by the rider, are selectable. For example, JP-B-2950957 proposes an ECVT whereby gear ratios can be manually set in accordance with positions of a deceleration lever. Also, for example, JP-A-Sho 62-175228 proposes an ECVT whereby gear ratios can be forcibly changed or in which a shift down operation can be manually made with a switch.

However, a conventional vehicle incorporating an ECVT that is changeable between the AT and MT modes requires complicated and troublesome operations when a shift down operation is intentionally made in AT mode to accelerate or decelerate the vehicle. Specifically, in AT mode, at least the following three operations are necessary to increase or decrease vehicle speed by shifting down intentionally:

1. A switching operation from AT to MT mode.
2. A shift down operation in MT mode.
3. A switching operation from MT to AT mode.

SUMMARY OF THE INVENTION

The present invention addresses these problems and allows an intentional shift down operation to be easily made in AT mode.

One embodiment of the invention is a control system for an electronically controlled transmission disposed between a drive source and a drive wheel of a straddle type vehicle that is capable of continuously changing a gear ratio. The straddle type vehicle has a mode temporarily changing switch that outputs a mode change signal to the control system. A gear ratio control section controls the gear ratio of the transmission. A gear change mode selecting section selects an AT mode in which the gear ratio control section continuously changes the gear ratio in accordance with a running state of the straddle type vehicle or an MT mode in which the gear ratio control section changes the gear ratio from among a plurality of predetermined multiple gear ratios. A release signal outputting section outputs a release signal when a predetermined operation is made to the straddle type vehicle and when a predetermined condition is satisfied in connection with the straddle type vehicle. An MT mode temporarily selecting section makes the gear change mode selecting section temporarily select the MT mode when the mode change signal is inputted under a condition that the AT mode is selected by the gear change mode selecting section. The MT mode temporarily selecting section also makes the gear ratio control section change the gear ratio to a gear ratio within the predetermined multiple gear ratios that exists in a LOW range that is lower than a current gear ratio. An AT mode returning section returns the gear change mode selected by the gear change mode selecting section to the AT mode when the release signal is outputted after the MT mode is temporarily selected by the MT mode temporarily selecting section.

Another embodiment of the invention is a transmission that has an electronically controlled gear change mechanism and a control system for controlling the gear change mechanism. The electronically controlled gear change mechanism is disposed between a drive source and a drive wheel of a straddle type vehicle, and is capable of continuously changing a gear ratio. A mode temporarily changing switch outputs a mode change signal to the control system. A gear ratio control section controls the gear ratio of the gear change mechanism. A gear change mode selecting section selects an AT mode in which the gear ratio control section continuously changes the gear ratio of the gear change mechanism in accordance with a running state of the straddle type vehicle, or an MT mode in which the gear ratio control section changes the gear ratio of the gear change mechanism from among a plurality of predetermined multiple gear ratios. A release signal outputting section outputs a release signal when a predetermined operation is made to the straddle type vehicle and when a predetermined condition is satisfied in connection with the straddle type vehicle. An MT mode temporarily selecting section makes the gear change mode selecting section temporarily select the MT mode when the mode change signal is inputted under a condition that the AT mode is selected by the gear change mode selecting section. The MT mode temporarily selecting section also makes the gear ratio control section change the gear ratio of the gear change mechanism to a gear ratio from among the plurality of predetermined gear ratios existing in a LOW range that is lower than a current gear ratio. An AT mode returning section returns the gear change mode selected by the gear change mode selecting section to the AT mode when the release signal is outputted after the MT mode is temporarily selected by the MT mode temporarily selecting section.

Another embodiment of the invention is a straddle type vehicle including a drive source that drives a drive wheel and a transmission. The transmission has an electronically controlled gear change mechanism disposed between the drive source and the drive wheel that is capable of continuously changing a gear ratio, and a control system that controls the gear change mechanism. A mode temporarily changing switch outputs a mode change signal to the control system. A gear ratio control section controls the gear ratio of the gear change mechanism. A gear change mode selecting section selects an AT mode in which the gear ratio control section continuously changes the gear ratio of the gear change mechanism in accordance with a running state of the straddle type vehicle, or an MT mode in which the gear ratio control section changes the gear ratio of the gear change mechanism from among a plurality of predetermined multiple gear ratios. A release signal outputting section outputs a release signal when a predetermined operation is made to the straddle type vehicle and when a predetermined condition is satisfied in connection with the straddle type vehicle. An MT mode temporarily selecting section makes the gear change mode selecting section temporarily select the MT mode when the mode change signal is inputted under a condition that the AT mode is selected by the gear change mode selecting section. The MT mode temporarily selecting section also makes the gear ratio control section change the gear ratio of the gear change mechanism to a gear ratio within the plurality of predetermined gear ratios existing in a LOW range that is lower than a current gear ratio. An AT mode returning section returns the gear change mode selected by the gear change mode selecting section to the AT mode when the release signal is outputted after the MT mode is temporarily selected by the MT mode temporarily selecting section.

According to the present invention, an intentional shift down operation is easily made in the AT mode.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Embodiment 1

《 Structure of Motorcycle 1 》

Figure 1:
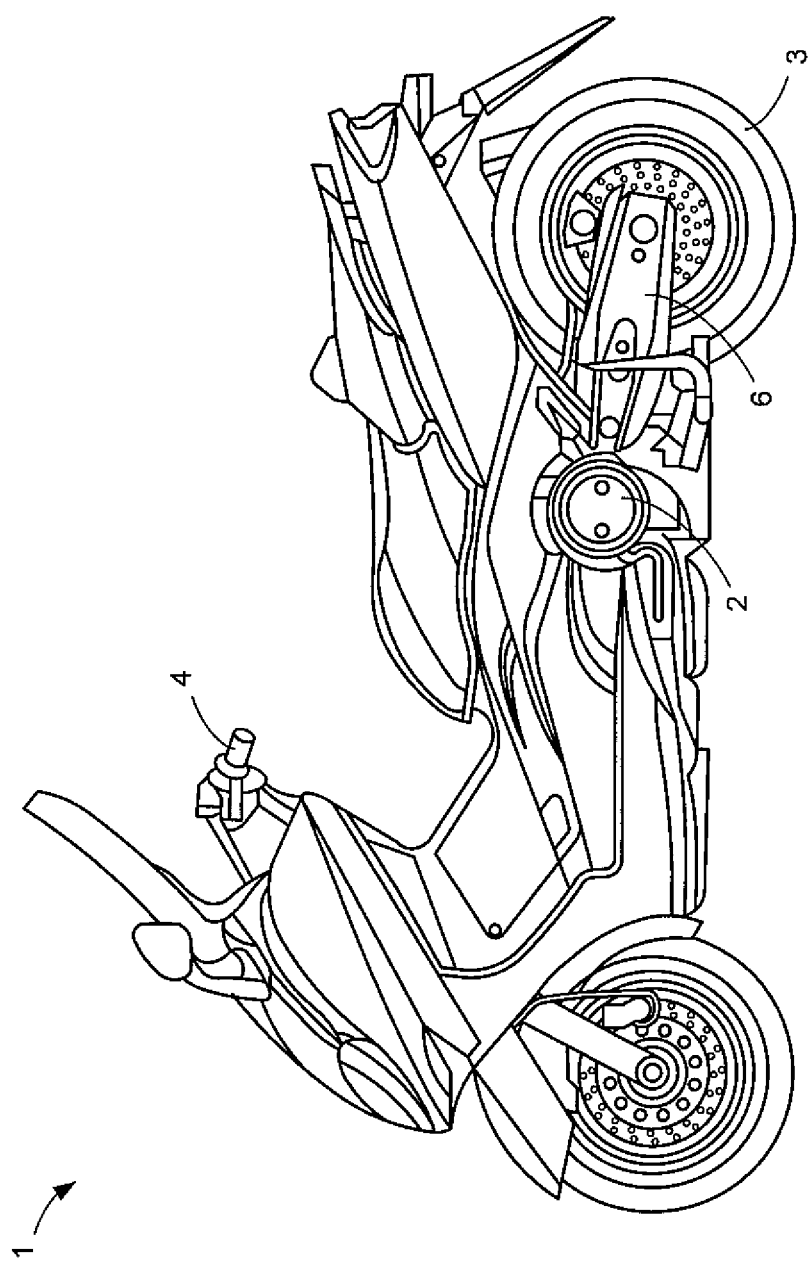
FIG. 1 is a side view of a two-wheeled motorized vehicle embodying the present invention.

Embodiments of the present invention are now described with reference to a scooter type motorcycle 1 as an example. As shown in FIG. 1, motorcycle 1 has a steering handle 4, a power unit 2 and a rear wheel 3 functioning as a drive wheel. Power unit 2 and rear wheel 3 are connected through a power transmission mechanism 6.

(Steering Handle 4)

Figure 2:
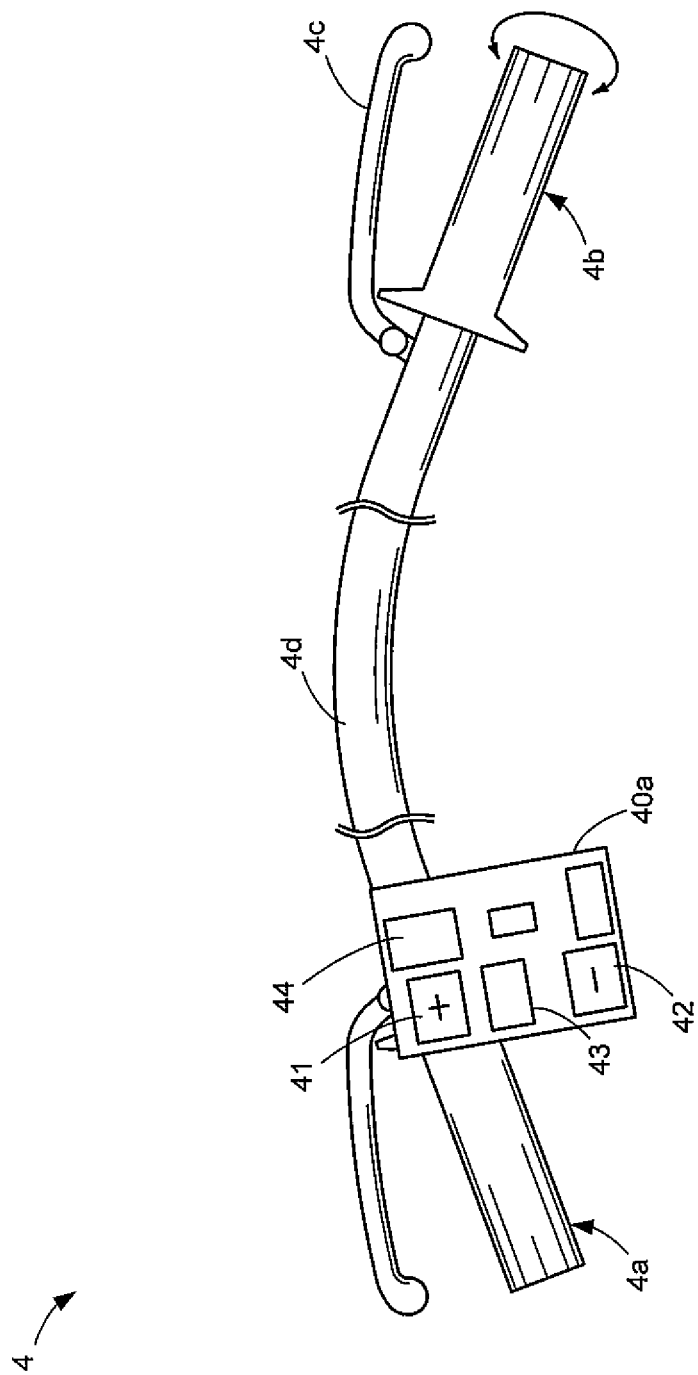
FIG. 2 is a schematic structural view of a steering handle portion.

FIG. 2 is a schematic structural view of steering handle 4. Steering handle 4 has a handle bar 4d coupled with a steering head pipe, a left grip section 4a and a right grip section 4b. Right grip section 4b is pivotable relative to handle bar 4d. When a rider pivots right grip section 4b, a throttle valve is operated to control a throttle opening.

Brake levers 4c are disposed adjacent to grip sections 4a, 4b. When the rider operates brake levers 4c, brakes are actuated and a brake signal 104 is outputted to an ECU 5.

A switch box 40a is disposed on a right side of left grip section 4a. Switch box 40a has various operation switches such as, for example, a shift up switch 41, a shift down switch 42, a mode temporarily changing switch 43 and a mode selecting switch 44.

Figure 3:
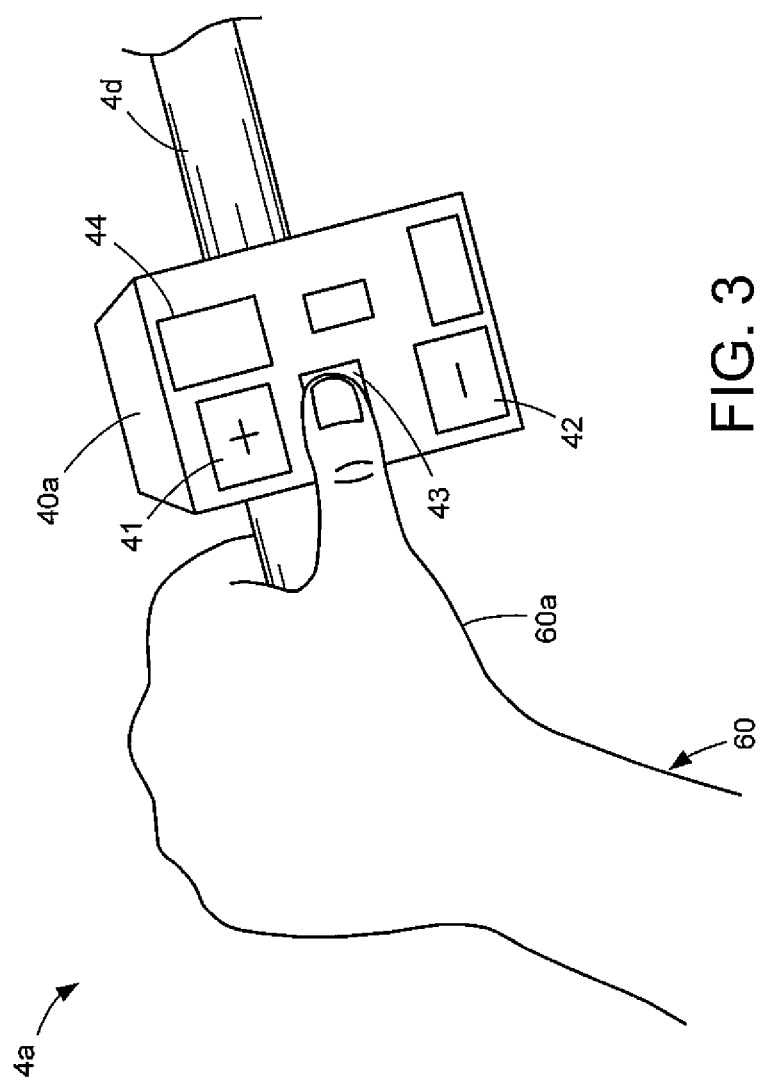
FIG. 3 is an enlarged schematic structural view of a left grip portion of the steering handle.

As shown in FIG. 3, operation switches 41-44 are positioned at locations to facilitate operation by a thumb 60a of left hand 60 of the rider. More specifically, switches 41-44 are arranged in a top surface facing the rider and slightly inclining downward toward a rear portion of switch box 40a.

The invention is not limited to this structure. Some of the switches such as, for example, shift up switch 41 can be arranged in a rear surface of switch box 40a from the rider's perspective so as to be operable by the rider's forefinger. For example, shift up switch 41 may be arranged in the rear surface while shift down switch 42 is arranged in the surface facing the rider. In other words, shift up switch 41 may be operable by the forefinger while shift down switch 42 is operable by thumb 60a. Alternatively, all operation switches may be arranged in the rear surface of switch box 40a to be operable by the rider's forefinger.

In this embodiment, switches 41-44 are formed as push type and button type switches. However, witches may also be formed as push type levers or rotary type switches whose knobs are moved among multiple positions.

As shown in FIG. 3, shift up switch 41, shift down switch 42 and mode temporarily changing switch 43 are positioned closest to left hand 60 of the rider, in other words, at the outermost positions in a vehicle width direction. Mode temporarily changing switch 43 is positioned between shift up switch 41 and shift down switch 42. Mode selecting switch 44 is spaced further from left hand 60 than switches 41-43 because switch 44 is used less than switches 41-43. Shift up switch 41, shift down switch 42 and mode temporarily changing switch 43 are used more frequently and are preferably positioned closer to left hand 60 to be easily operated.

The location of mode selecting switch 44 is not limited to left grip section 4a. For example, switch 44 may be placed in a further switch box disposed on the left side of right grip section 4b. In this alternative, mode selecting switch 44 is preferably located to be operable by the forefinger of the rider's right hand.

(Power Unit 2)

Figure 4:
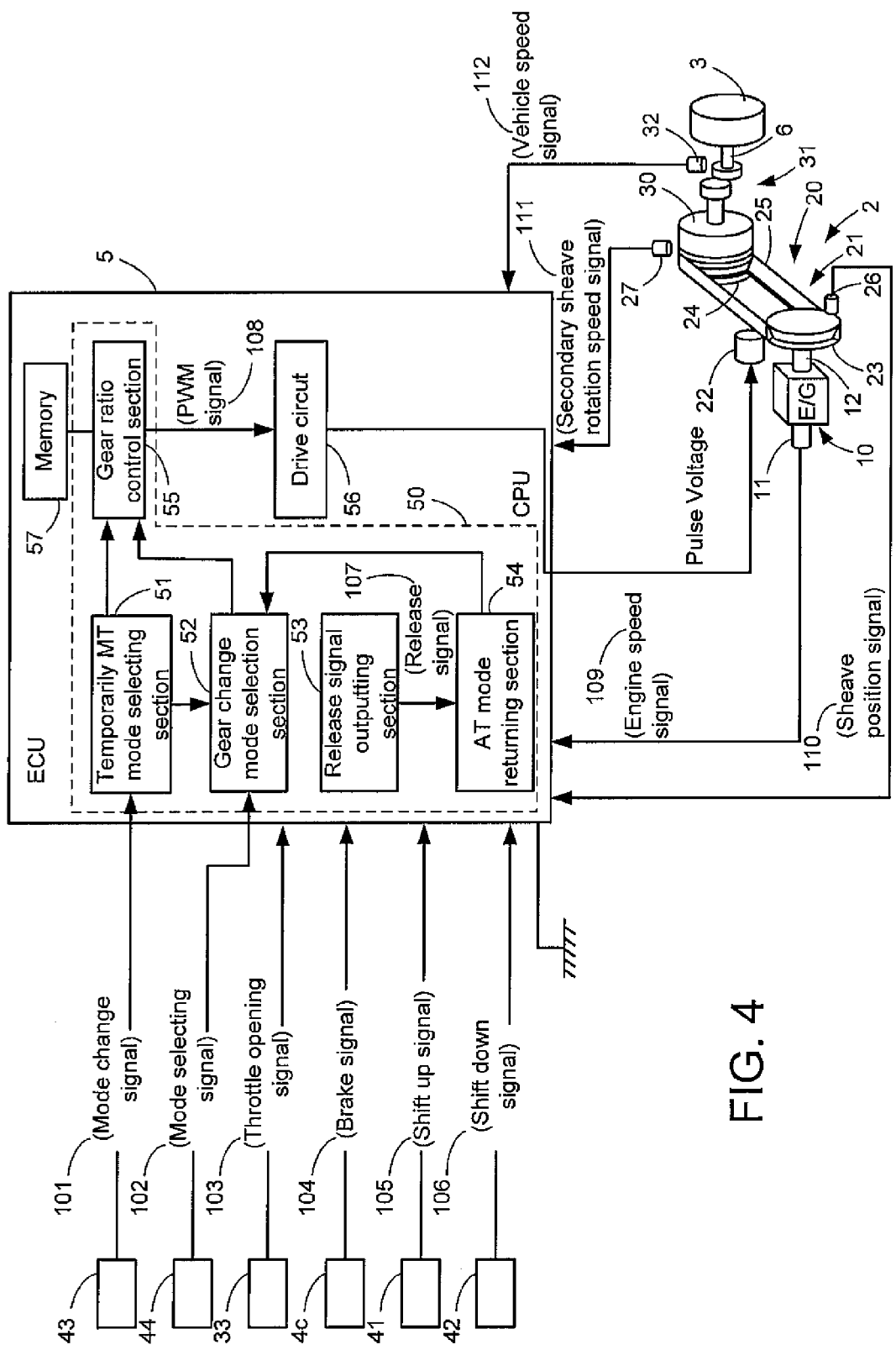
FIG. 4 is a block diagram of a control system.

As shown in FIG. 4, an engine (E/G) 10 functioning as the drive source, an electronically controlled transmission 20, a centrifugal clutch 30 and a speed reduction mechanism 31 are provided. Transmission 20 has a gear change mechanism 21 and an electric motor 22 functioning as an actuator. Motor 22 is used for changing a gear ratio of gear change mechanism 21.

Gear change mechanism 21 has a primary sheave 23 and a secondary sheave 24. Primary sheave 23 is mounted to an output shaft 12 of engine 10 and rotates together with rotation of output shaft 12. A belt 25 whose cross section generally has a V-shape is wound around primary sheave 23 and secondary sheave 24. Motor 22 is attached to primary sheave 23. A width of a belt groove of primary sheave 23 around which belt 25 is wound is changed by motor 22. The gear ratio of gear change mechanism 21 can thereby be continuously changed without steps.

Secondary sheave 24 is connected to speed reduction mechanism 31 through centrifugal clutch 30. Speed reduction mechanism 31 is connected to rear wheel 3 through power transmission mechanism 6 formed, for example, with a belt, a chain, a drive shaft, etc.

Centrifugal clutch 30 is connected or disconnected in accordance with the rotational speed of secondary sheave 24. Centrifugal clutch 30 is disconnected if the rotational speed of secondary sheave 24 is less than a predetermined speed, and rotation of secondary sheave 24 is thereby not transmitted to rear wheel 3. On the other hand, centrifugal clutch 30 is connected if the rotational speed of secondary sheave 24 is equal to or greater than the predetermined speed, and rotation of secondary sheave 24 is thereby transmitted to rear wheel 3 through centrifugal clutch 30, speed reduction mechanism 31 and power transmission mechanism 6 to rotate rear wheel 3.

«Control Block of Motorcycle 1»

A control block of motorcycle 1 is described with reference to FIG. 4. As shown in FIG. 4, motorcycle 1 is mainly controlled by ECU (electronic control unit) 5 as a control system. ECU 5 includes a memory 57 storing various settings; a CPU (central processing unit) 50 as a calculating section and a drive circuit 56. CPU 50 has an MT mode temporarily selecting section 51, a change mode selecting section 52, a release signal outputting section 53, an AT mode returning section 54 and a gear ratio control section 55.

Various sensors and switches are connected to ECU 5. More specifically, a mode temporarily changing switch 43, a mode selecting switch 44, a shift up switch 41, a shift down switch 42, a throttle opening sensor 33, a brake lever 4c, an engine speed sensor 11, a sheave position detecting sensor 26, a secondary sheave rotational speed sensor 27 and a vehicle speed sensor 32 are connected to ECU 5.

Mode temporarily changing switch 43 outputs a mode change signal 101 to ECU 5 when operated by the rider. Mode selecting switch 44 outputs a mode selection signal 102 to ECU 5 when operated by the rider. Throttle opening sensor 33 detects and outputs a throttle opening of motorcycle 1 to ECU 5 as a throttle opening signal 103. Brake lever 4c outputs a brake signal 104 to ECU 5 when operated by the rider. Shift up switch 41 outputs a shift up signal 105 to ECU 5 when operated by the rider. Shift down switch 42 outputs a shift down signal 106 to ECU 5 when operated by the rider.

Engine speed sensor 11 detects and outputs a rotational speed of engine 10 to ECU 5 as an engine speed signal 109.

Sheave position detecting sensor 26 detects a gear ratio of gear change mechanism 21. More specifically, sheave position detecting sensor 26 detects a width of the belt groove of primary sheave 23. For example, if primary sheave 23 is formed with a fixed sheave body and a movable sheave body movable relative to the fixed sheave body as in this embodiment, sheave position detecting sensor 26 detects and outputs a position of the movable sheave body relative to the fixed sheave body to ECU 5 as a sheave position signal 110.

Secondary sheave rotational speed sensor 27 detects and outputs the rotational speed of secondary sheave 24 to ECU 5 as a secondary sheave rotational speed signal 111.

Vehicle speed sensor 32 detects and outputs a vehicle speed of motorcycle 1 to ECU 5. Vehicle speed sensor 32 may detect a rotational speed of rear wheel 3, the output shaft of speed reduction mechanism 31 or the front wheel.

(Outline of Control by ECU 5)

ECU 5 controls engine 10. More specifically, ECU 5 calculates an engine speed that is a target value based upon throttle opening signal 103 and vehicle speed signal 112. ECU 5 controls the rotational speed of engine 10 to be the target engine speed by controlling ignition timing of an ignition system of engine 10 and a fuel supply amount to engine 10 while monitoring engine speed signal 109.

ECU 5 also controls transmission 20. More specifically, ECU 5 calculates a gear ratio that is a target value using engine speed signal 109 and vehicle speed signal 112. ECU 5 determines a current gear ratio of transmission 20 using sheave position signal 110, etc. ECU 5 outputs a PWM pulse-width modulation) signal 108 to drive circuit 56 based upon the calculated target gear ratio and the determined current gear ratio. Drive circuit 56 applies a pulse voltage to motor 22 in response to the inputted PWM signal 108. The gear ratio of transmission 20 is thereby controlled to be the target gear ratio.

In this embodiment, the actuator for changing the gear ratio of gear change mechanism 21 is motor 22 controlled by PWM. The invention, however, is not limited to this type of actuator. For example, the actuator changing the gear ratio of transmission 20 may be an electric motor controlled by PAM (pulse amplitude modulation), a step motor or a hydraulic actuator.

Control of the gear ratio of transmission 20 is now described in greater detail.

Selection of gear change modes is first described with reference to FIG. 5.

(Selection of Gear Change Modes)

In motorcycle 1, an AT mode, a manual MT mode and an automatic MT mode are selectable. As shown in FIG. 5, one of the AT mode, manual MT mode and automatic MT mode can be selected by operation of mode selecting switch 44.

As shown in FIG. 4, when mode selecting switch 44 is operated, it outputs a mode selection signal 102 to gear change mode selecting section 52 of ECU 5. The gear change mode is then changed from a current gear change mode as shown in FIG. 5. For example, if the current gear change mode is AT mode, it is changed to automatic MT mode by a single operation of mode selecting switch 44. Another operation of mode selecting switch 44 changes the gear change mode to manual MT mode from automatic MT mode. A further operation of mode selecting switch 44 changes the gear change mode to AT mode from manual MT mode. That is, the gear change modes change in turn whenever mode selecting switch 44 is operated and mode selection signal 102 is outputted. When the gear change mode changes as thus described, gear ratio control section 55 controls the gear ratio of transmission 20 in accordance with the changed gear change mode.

In this embodiment, an example in which the gear change modes change in turn whenever mode selecting switch 44 is operated is described. Alternatively, for example, a mode selecting switch for selecting AT mode, another mode selecting switch for selecting automatic MT mode, and a further mode selecting switch for selecting manual MT mode could be separately provided.

"AT Mode"

In AT mode, the gear ratio of transmission 20 is continuously and automatically changed without steps by gear change ratio control section 55 in accordance with running states of motorcycle 1. For example, the gear ratio of transmission 20 may be continuously and automatically changed based upon a predetermined gear ratio map.

Memory 57 in ECU 5 stores a gear ratio map defining relationships between running states of motorcycle 1 such as vehicle speed, engine speed, throttle opening, and gear ratio. Gear ratio control section 55 calculates the target gear ratio based upon the gear ratio map, vehicle speed signals 112 and engine speed signals 109. Gear ratio control section 55 outputs a PWM signal 108 based upon the calculated target gear ratio, sheave position signal 110 and secondary sheave rotational speed signal 111 to drive circuit 56. Drive circuit 56 applies a pulse voltage corresponding to PWM signal 108 to motor 22. Motor 22 is thereby driven and the width of the belt groove of primary sheave 23 adjusted to change the gear ratio of transmission 20 to the target gear ratio.

"MT Mode"

In MT mode, the gear ratio of transmission 20 is automatically or manually changed among predetermined multiple gear ratios. In manual MT mode, the gear ratio of transmission 20 is changed by operation of shift up switch 41, shift down switch 42 or the like. That is, in manual MT mode, shift changes are made by the rider. Additionally, the "MT mode" can be called a fake MT mode to be distinguished from a normal manual transmission mode in which gear ratios are physically changed among multiple gears.

"Manual MT Mode"

Figure 6:
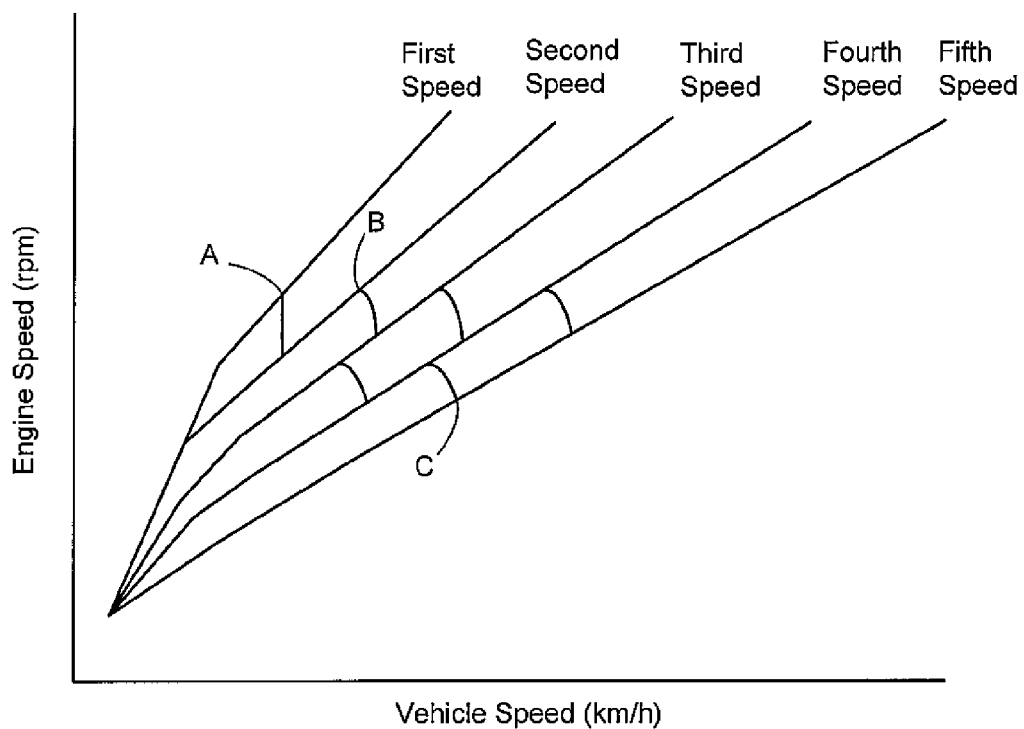
FIG. 6 is a V-N line graph depicting shift changes in a manual MT mode.

More specifically, as shown in FIG. 6, five and almost fixed gear ratios, i.e., first, second, third, fourth and fifth speeds are set in this order from the lowest speed The gear ratios of the first through fifth speeds can be completely fixed. Alternatively, the gear ratios can be changed in accordance with engine speed. For example, the gear ratios of the first through fifth speeds can be set such that the gear ratio is positioned closer to the top speed as the engine speed increases. In manual MT mode, in principle, the gear ratio does not change unless shift up switch 41, shift down switch 42 or the like is operated. In other words, the gear ratio is not automatically changed unless the rider operates shift up switch 41, shift down switch 42 or the like. However, the shift down operation can be exceptionally and forcibly made for purposes such as, for example, avoiding an engine stall under a deceleration condition of motorcycle 1.

With reference to FIG. 6, if motorcycle 1 starts to run at the first speed, the gear ratio stays at the first speed until shift up switch 41 is operated. When shift up switch 41 is operated at point A, it outputs shift up signal 105 (FIG. 4) to ECU 5. Gear ratio control section 55 then outputs PWM signal 108 to change the gear ratio from the first to the second speed to drive circuit 56. Drive circuit 56 applies a pulse voltage corresponding to PWM signal 108 to motor 22. As shown in FIG. 6, the gear ratio thereby changes to the second speed. Similarly, when shift up switch 41 is further operated at point B, the gear ratio changes to the third speed.

On the other hand, when shift down switch 42 is operated, for example, at point C, it outputs a shift down signal 106 (FIG. 4) to ECU 5. Gear ratio control section 55 then outputs PWM signal 108 to change the gear ratio from the fifth to the fourth speed to drive circuit 56. Drive circuit 56 applies a pulse voltage corresponding to PWM signal 108 to motor 22. As shown in FIG. 6, the gear ratio thereby changes from the fifth to the fourth speed.

"Automatic MT Mode"

In automatic MT mode, the gear ratio of transmission 20 is automatically changed among the predetermined multiple gear ratios by gear ratio control section 55 without any rider operations.

Figure 7:
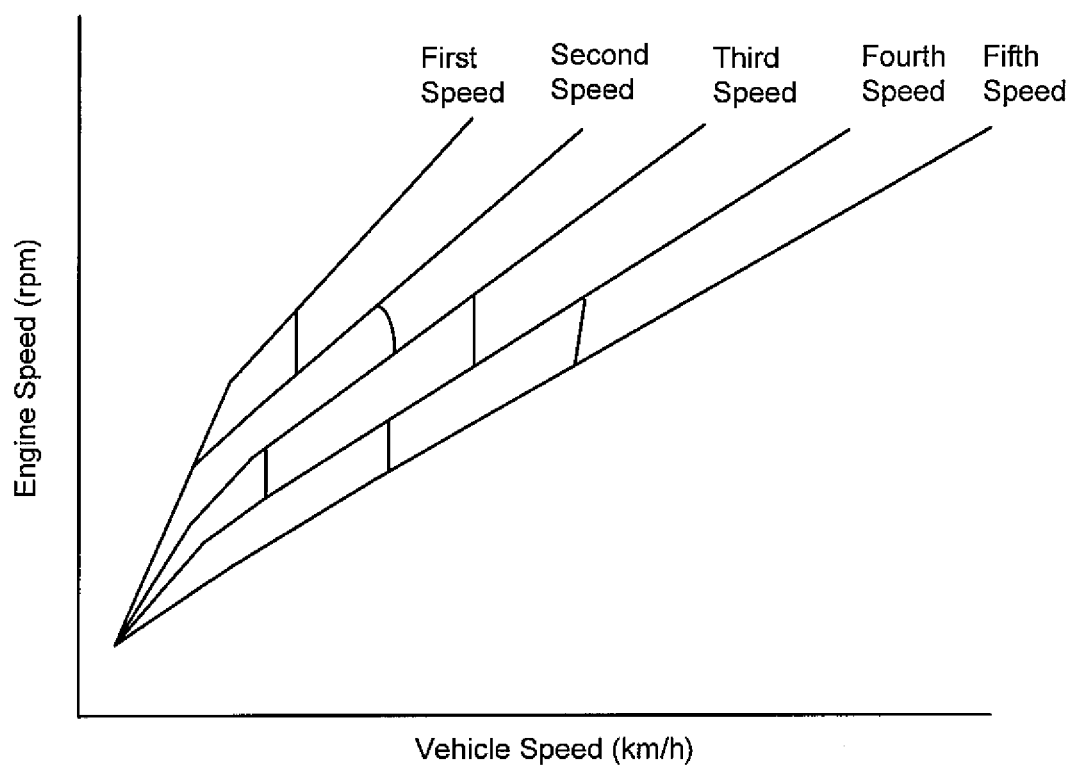
FIG. 7 is a V-N line graph depicting shift changes in an automatic MT mode.

As shown in FIG. 7, if automatic MT mode is selected by gear change mode selecting section 52, gear ratios are automatically changed in accordance with changes of the running states of motorcycle 1 without any rider operations. However, in contrast to AT mode, the gear ratio is not continuously changed without steps in automatic MT mode. That is, in automatic MT mode, the gear ratio is automatically changed among the predetermined gear ratios.

Additionally, in automatic MT mode, shift change timing is set to be different in accordance with, for example, the throttle opening or the like. More specifically, if the rider greatly opens the throttle valve (i.e., throttle opening: large) to quickly accelerate the motorcycle, the shift change is made at a relatively high engine speed. On the other hand, if the rider slightly opens the throttle valve (i.e., throttle opening: small) to slowly accelerate the motorcycle, the shift change is made at a relatively low engine speed. The shift change timing is also set to be different in accordance with the throttle opening or the like in the shift down operation, similarly to the shift up operation.

(MT Shift Down Mode)

"Outline of MT Shift Down Mode"

Figure 5:
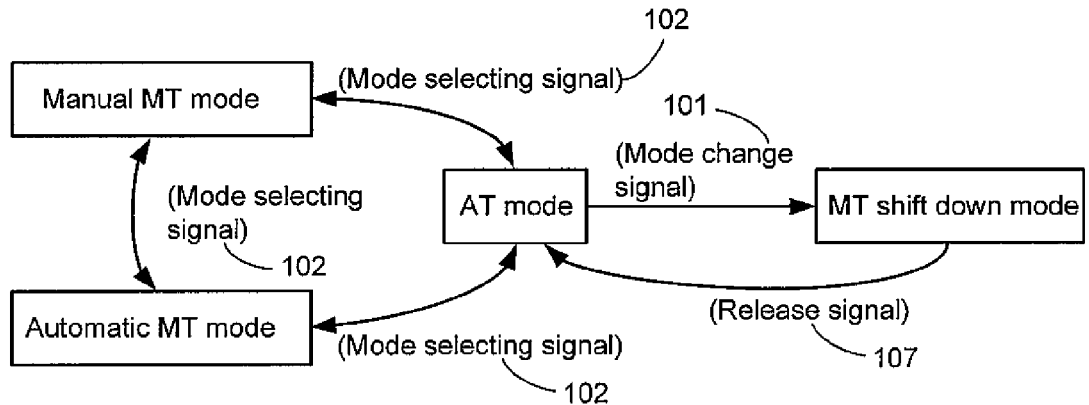
FIG. 5 is a conceptual illustration showing gear change modes.

As shown in FIG. 5, when a mode change signal 101 is outputted from mode temporarily changing switch 43 in AT mode, MT shift down mode is temporarily selected. Along with this selection, the gear ratio of transmission 20 is changed by gear ratio control section 55 to a gear ratio in a LOW range that is lower than the current gear ratio within the predetermined multiple gear ratios (first through fifth speeds). If mode temporarily changing switch 43 is operated in MT shift down mode, the gear ratio is changed to a gear ratio in a LOW range that is even lower than the current gear ratio. When a release signal 107 is outputted from release signal outputting section 53 (FIG. 4) in MT shift down mode, the mode returns to AT mode from MT shift down mode.

For example, in MT mode, the rider can optionally change the gear ratio of transmission 20. To the contrary, in AT mode, the rider cannot optionally change the gear ratio because the gear ratio is automatically changed. In MT shift down mode, a kick down operation or activation of engine brake are enabled with a rider's simple operation in a state that AT mode is selected.

In this embodiment, the gear ratio is changed by gear ratio control section 55 to a gear ratio within the predetermined multiple gear ratios (first through fifth speeds) that is the closest to the current gear ratio and is in a LOW range that is lower than the current gear ratio. However, the invention is not so limited. For example, the gear ratio can be changed to a gear ratio that is closer to the current gear ratio than the gear ratio in the LOW range that is closest to and lower than the current gear ratio.

More specifically, the gear ratio can be changed to a gear ratio within the predetermined multiple gear ratios (first through fifth speeds) that is closer by one stage to the current gear ratio than the gear ratio in the LOW range that is closest to and lower than the current gear ratio. Furthermore, the gear ratio can be changed to a gear ratio within the predetermined multiple gear ratios (first through fifth speeds) that is closer by two stages or more to the current gear ratio than the gear ratio in the LOW range that is closest to and lower than the current gear ratio of transmission 20.

Alternatively, the rider can set shift down amounts. For example, if the rider desires to make a relatively quick drive, the rider can select a mode having a large shift down amount. If the rider desires to make a relatively slow drive, the rider can select a mode having a small shift down amount. Furthermore, multiple mode temporarily changing switches 43 can be provided. For example, a mode temporarily changing switch 43 whose shift down amount is relatively small and another mode temporarily changing switch 43 whose shift down amount is relatively large can be provided.

"Detail of MT Shift Down Mode"

MT shift down mode is now described in greater detail with reference to FIGS. 8-13. An example in which MT shift down mode is a manual gear change mode in which the gear ratio of transmission 20 is changed by gear ratio control section 55 among the predetermined multiple gear ratios (first through fifth speeds) in response to operation of the operation switches is described. However, the MT shift down mode can alternatively be a gear change mode in which the gear ratio is automatically changed by gear ratio control section 55 in accordance with the running states of motorcycle 1.

Figure 8:
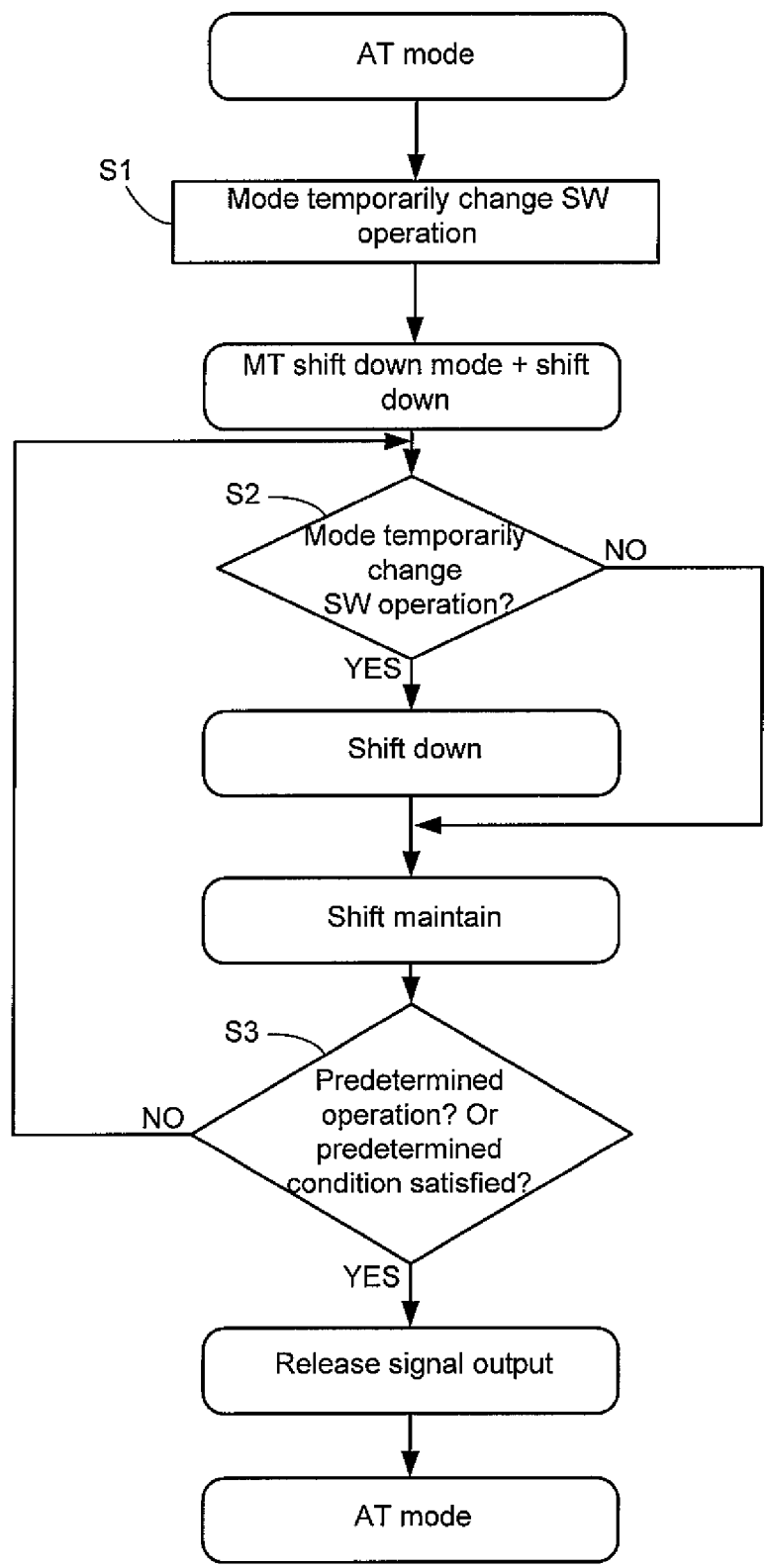
FIG. 8 is a general flowchart of an MT shift down mode.
Figure 13:
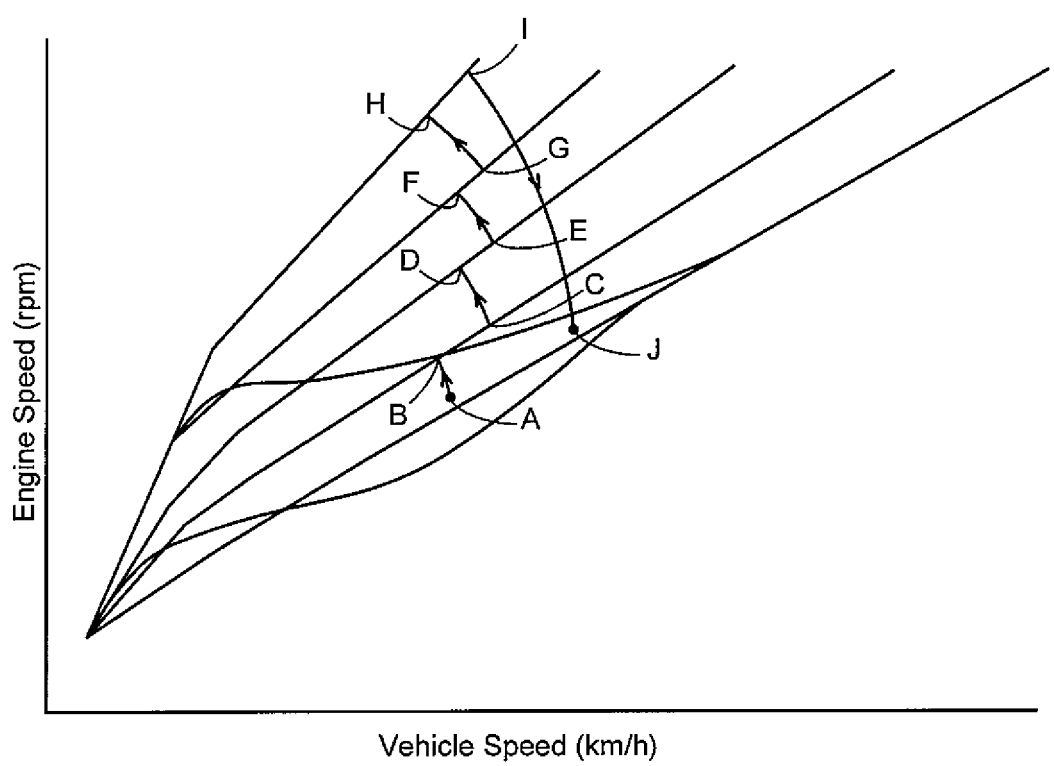
FIG. 13 is a V-N line graph in the MT shift down mode.

As shown in FIG. 8, if mode temporarily changing switch 43 is operated in step S1 while AT mode is selected by gear change mode selecting section 52, MT shift down mode is temporarily selected. A mode change signal 101 is outputted to MT mode temporarily selecting section 51 of ECU 5. MT mode temporarily selecting section 51 then commands gear change mode selecting section 52 to select MT shift down mode. Along with this selection, the gear ratio of transmission 20 is changed by gear ratio control section 55 to a gear ratio within the predetermined multiple gear ratios (first through fifth speeds) that is the closest to the current gear ratio and exists in a LOW range that is lower than the current gear ratio. For example, as shown in FIG. 13, if mode change signal 101 is outputted at point A positioned between the fifth and fourth speeds, the gear ratio is changed to point B representing the fourth speed.

Additionally, if the gear ratio given when mode temporarily changing switch 43 is operated is consistent with one of the predetermined multiple gear ratios (first through fifth speeds), a gear ratio consistent with the current gear ratio within the predetermined multiple gear ratios is maintained. On this occasion, the shift down operation is not substantially made in the operating time of mode temporarily changing switch 43. However, because, afterwards, the gear ratio is maintained at the current gear ratio, the shift down operation is made later by comparing with the AT mode in which the gear ratio is changing toward the shift up range.

In step S2, if mode temporarily changing switch 43 is operated in MT shift down mode, the shift down operation is made. For example, if mode temporarily changing switch 43 is operated at point C of FIG. 13, a mode change signal 101 is outputted to ECU 5. The gear ratio is then shifted down to a gear ratio (third speed, point D) in a LOW range that is lower than the current gear ratio (fourth speed) by gear change ratio control section 55.

After the shift down operation, the downwardly shifted gear ratio is maintained. Next, at step S3, ECU 5 determines whether a predetermined operation is made to motorcycle 1 and whether a predetermined condition is satisfied. If ECU 5 determines that the predetermined operation is made and the predetermined condition is satisfied, a release signal 107 (FIG. 4) is outputted to AT mode returning section 54 from release signal outputting section 53. AT mode returning section 54 then returns the gear change mode to AT mode.

On the other hand, if ECU 5 determines at step S3 that the predetermined operation is not made or the predetermined condition is not satisfied, ECU 5 returns to step S2 to determine whether mode temporarily changing switch 43 is operated. Therefore, if mode temporarily changing switch 43 is operated in MT shift down mode, the shift down operation is further made. That is, whenever mode temporarily changing switch 43 is operated in MT shift down mode, the shift down operation is made.

More specifically, if mode temporarily changing switch 43 is operated at point E in FIG. 13 after the gear ratio is shifted down to the third speed, as described above, the gear ratio is shifted down to a gear ratio (second speed, point F) in a LOW range that is lower than the current gear ratio (third speed). Moreover, if mode temporarily changing switch 43 is operated at point G in FIG. 13, the gear ratio is shifted down to a gear ratio (first speed, point H) existing in a LOW range that is lower than the current gear ratio (second speed). If ECU 5 makes a predetermined operation at point I, for example, the mode returns to AT mode from MT shift down mode and the gear ratio is shifted up to point J.

"Detail of Step S3"

The predetermined condition and operation determined at step S3 are not specifically limited, and can be any condition and operation used to determine that the rider no longer intends, or intends in a weaker fashion, to accelerate or to activate an engine brake.

Figure 9:
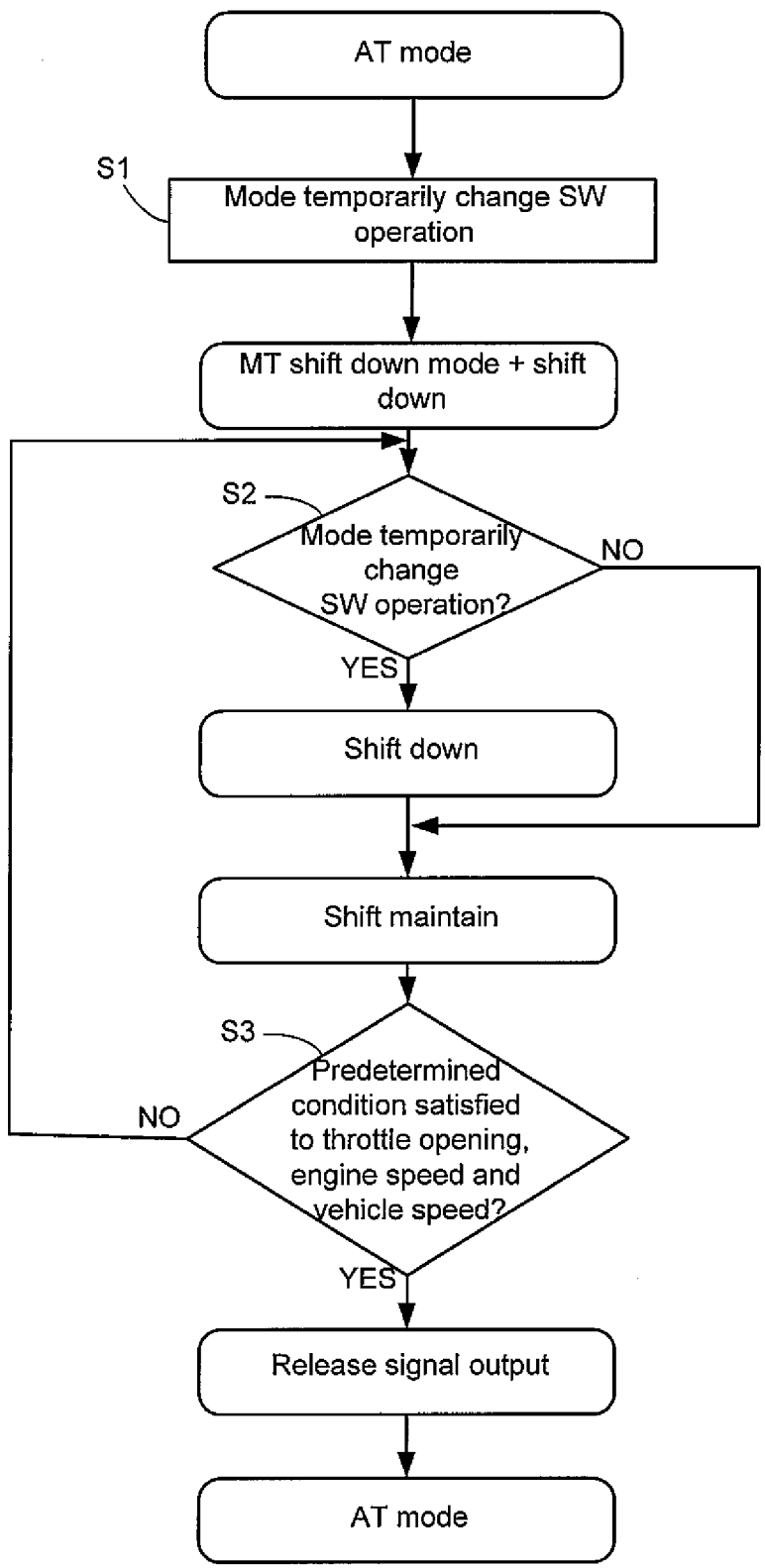
FIG. 9 is a flowchart of a specific example 1 of the MT shift down mode.

For example, as shown in FIG. 9, the gear change mode can return to AT mode when at least one of the throttle opening, engine speed and vehicle speed satisfies a predetermined condition. Thus, for example, the gear change mode can return to AT mode when the throttle opening reaches or falls below a preset opening, or when the throttle opening returns to the opening given when MT shift down mode was selected. The gear change mode can return to AT mode if the throttle opening is continuously kept at a constant value during a preset period of time.

Also, the gear change mode can return to AT mode when the engine speed reaches or exceeds a preset rotational speed. More specifically, the gear change mode can return to AT mode when the engine speed reaches a revolution limit.

The gear change mode can return to AT mode when the vehicle speed reaches or exceeds a preset speed. The gear change mode can return to AT mode when a vehicle acceleration value obtained by differentiating the vehicle speed with respect to time reaches or falls below a preset vehicle acceleration value.

Figure 10:
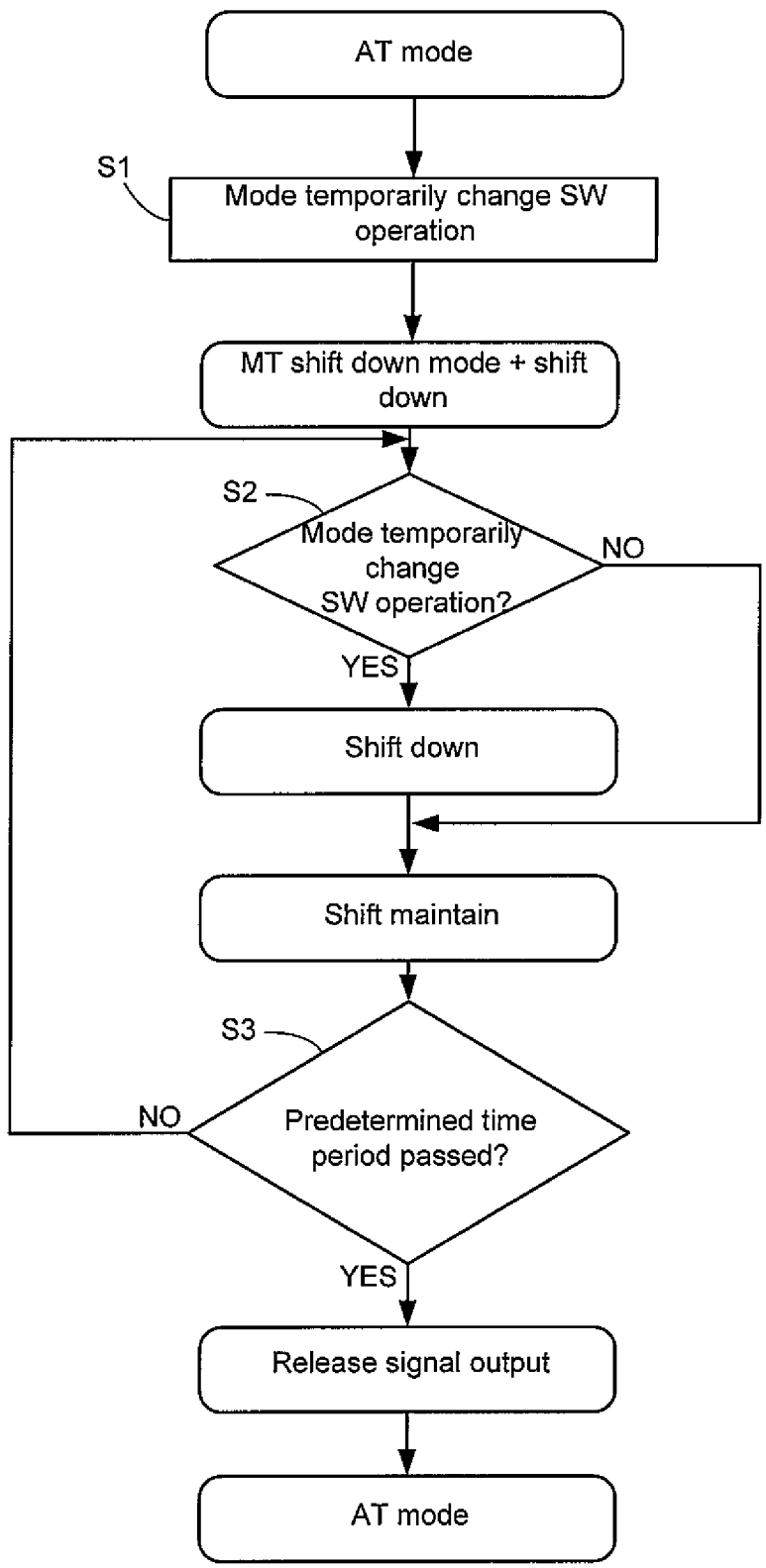
FIG. 10 is a flowchart of a specific example 2 of the MT shift down mode.

Also, as shown, for example, in FIG. 10, the gear change mode can return to AT mode when a preset period of time elapses after MT shift down mode has been selected by MT mode temporarily selecting section 51. For example, the gear change mode can return to AT mode when a period of 3-120 seconds elapses after MT shift down mode is selected by MT mode temporarily selecting section 51.

Figure 11:
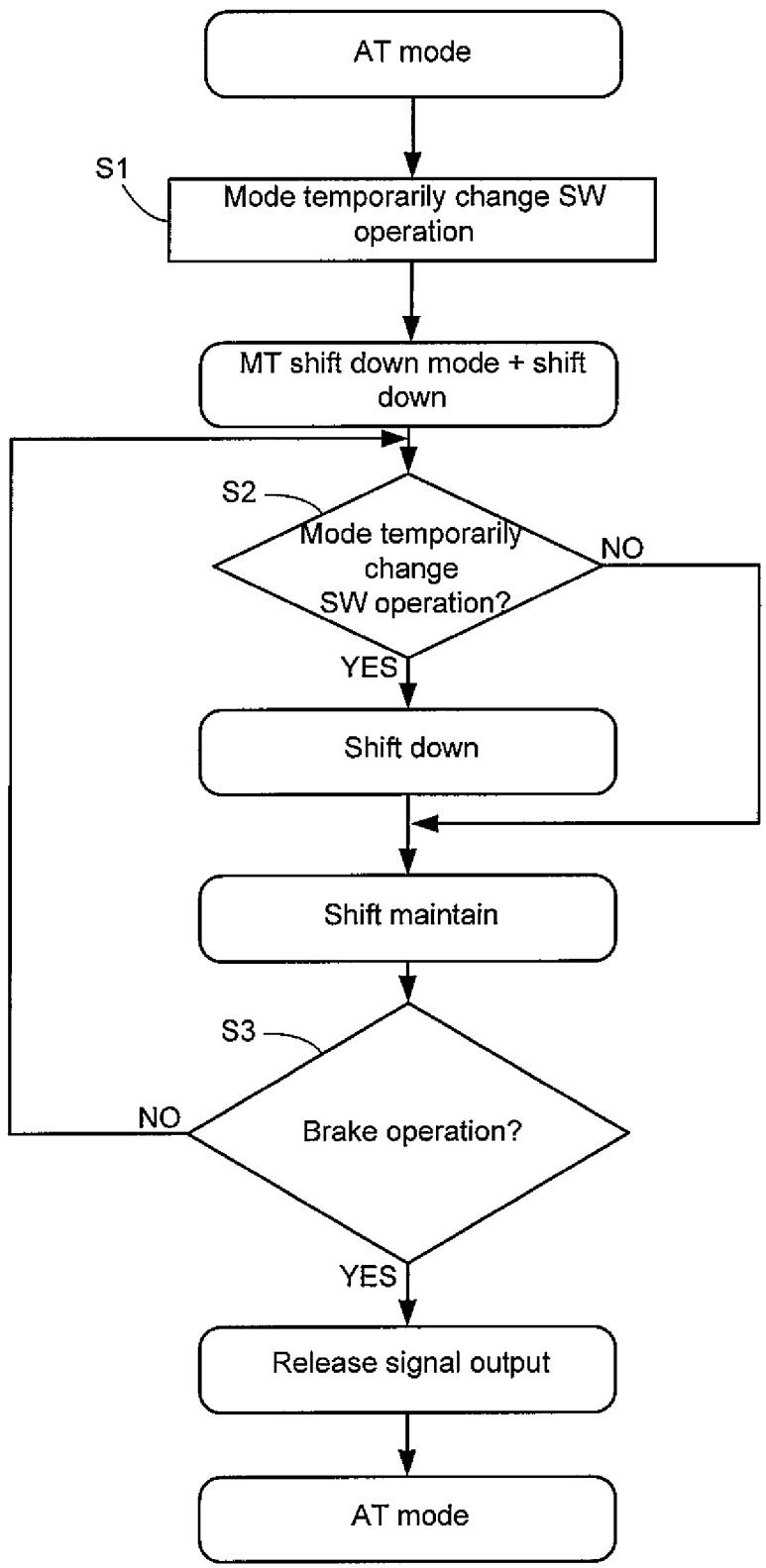
FIG. 11 is a flowchart of a specific example 3 of the MT shift down mode.

As shown in FIG. 11, for example, the gear change mode can return to AT mode when, in MT shift down mode, the brake lever is operated and a brake signal 104 is outputted to ECU 5 or when brake signal 104 is released after brake signal 104 has been outputted to ECU 5.

Figure 12:
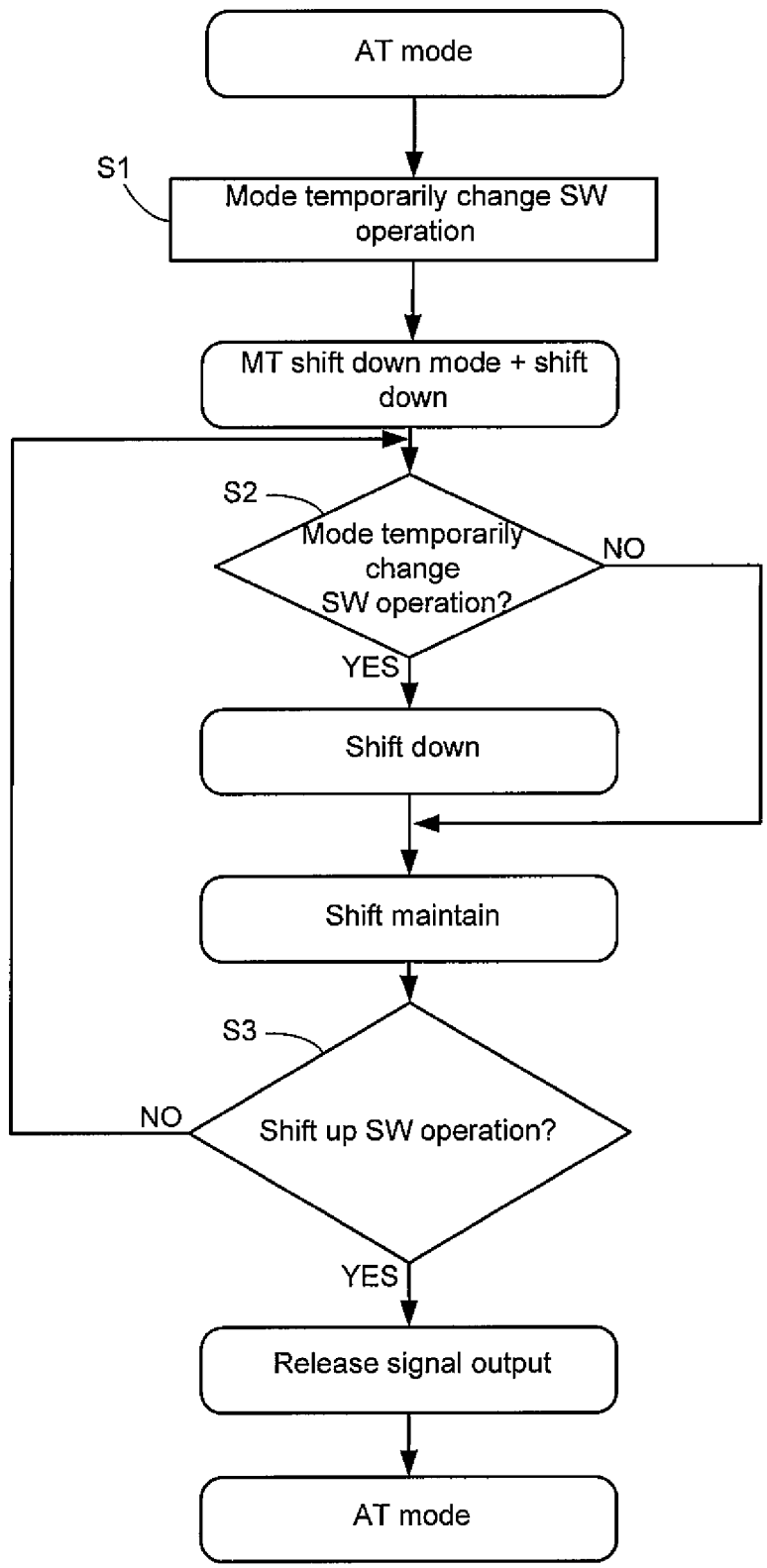
FIG. 12 is a flowchart of a specific example 4 of the MT shift down mode.

Furthermore, as shown in FIG. 12, the gear change mode can return to AT mode when, in MT shift down mode, shift up switch 41 is operated and a shift up signal 105 is outputted to ECU 5. In other words, once the MT shift down mode is entered, shift up is disabled until the MT shift down mode is exited.

« Action and Effect «

In this embodiment, when the rider simply operates mode temporarily changing switch 43 in AT mode, MT shift down mode is selected. Therefore, a shift down operation is easily and quickly made by a single operation of mode temporarily changing switch 43. A kick down operation or activation of engine brake is thereby easily and quickly made.

In a conventional motorcycle in which both AT and MT modes are selectable, a shift down operation can be made. However, at least the following two operations are necessary to shift down the gear ratio of the transmission:

1. Operation of the mode selection switch to shift from AT to MT mode.
2. Operation of the shift down switch to perform a shift down.

Accordingly, not only is operation of the gear ratio complicated, the shift down operation is also difficult to make quickly. In this embodiment, by contrast, a shift down operation is easily and quickly made in AT mode by one operation, such as an operation of mode temporarily change switch 43.

Additionally, a manner for enabling kick down operation or activation of engine brake can be proposed such that, in AT mode, a kick down mode is set in which transmission 20 is controlled using a target gear ratio shifted to a LOW range by a certain amount from the gear ratio calculated out from the gear change map. The kick down operation is made by operation of a switch for shifting to kick down mode. However, the kick down mode is AT mode eventually. Hence, it is difficult to achieve a brisk kick down operation having a direct sense or deceleration whose engine brake effect is large.

In this embodiment, by contrast, the mode changes to MT shift down mode when mode temporarily changing switch 43 is operated. The shift down operation is then made in MT mode. Therefore, a brisk kick down operation having a fixed gear change sense and a direct sense or deceleration by engine brake is made.

In this embodiment, the mode automatically returns to AT mode from MT shift down mode when a predetermined operation is made and a predetermined condition is satisfied. That is, in AT mode, the temporal shift down operation in MT mode is made easily and quickly. Therefore, acceleration for passing another vehicle or the like while running in AT mode and deceleration for activating engine brake can be very easily made. Improved drivability is thereby realized because normally no shift change is necessary and thus no complicated shift change is required. If the rider wishes to accelerate or decelerate relatively strongly, the rider can select MT shift down mode with a simple operation to briskly accelerate or decelerate the vehicle.

The mode returns to AT mode without any specific rider operation if it is set to return to At mode when at least one of the throttle opening, engine speed and vehicle speed satisfies a predetermined condition as shown in FIG. 9, or if it is set to return to AT mode when a preset period of time elapses after MT shift down mode is selected by MT mode temporarily selecting section 51 (FIG. 10). Therefore, the return to AT mode is easily made. AT mode is surely returned to since no specific operation is necessary, thereby avoiding a failure to return to AT mode due to rider carelessness or the like.

If the mode is set to return to AT mode when brake lever 4c is operated by the rider in MT shift down mode (FIG. 11), or when shift up switch 41 is operated by the rider in MT shift down mode (FIG. 12), MT shift down mode continues unless the rider's intent to make a shift down disappears, and surely returns to AT mode when the rider wishes to return to AT mode. Thus, the rider's intent is accurately reflected.

In this embodiment, if the rider further operates mode temporarily changing switch 43 in MT shift down mode, the mode is further shifted down. Thus, a further shift down operation is possible, for example, if the rider judges that the shift down amount provided just by putting the mode into MT shift down mode is insufficient. Thus, the rider can more freely operate motorcycle 1.

Alternatively, in this embodiment, a further shift down operation can be made by operation of shift down switch 42 in MT shift down mode.

Also, the gear ratio of transmission 20 can be shifted up when shift up switch 41 is operated in MT shift down mode.

In this embodiment, the various switches such as mode temporarily changing switch 43 are push type switches that are easily operated. However, the operation switches can also be lever type switches.

In this embodiment, the various switches such as mode temporarily changing switch 43 are operable by a rider's thumb, which is comparatively freely movable relative to the other fingers in the steering operation of motorcycle 1. Therefore) operability of the switches is enhanced. In particular, the thumb is more easily moved than the other fingers when the rider grasps brake lever 4c. Simultaneous operations of the brake and switches are thus relatively easily made.

Also, in this embodiment, the switches are disposed in left grip section 4a on the opposite side to right grip section 4b where the rider operates the throttling member. Therefore, the rider can easily and simultaneously operate the operation switches and the throttling member.

In this embodiment, two kinds of MT modes, i.e., manual MT mode and automatic MT mode are selectable. The rider thus can make a shift change at will by selecting manual MT mode. On the other hand, if the rider prefers a shift change that has a higher direct sense and more MT taste but does not prefer making a shift change, the rider can select automatic MT mode to automatically make a fake MT shift change.

<Variation 1>

Figure 14:
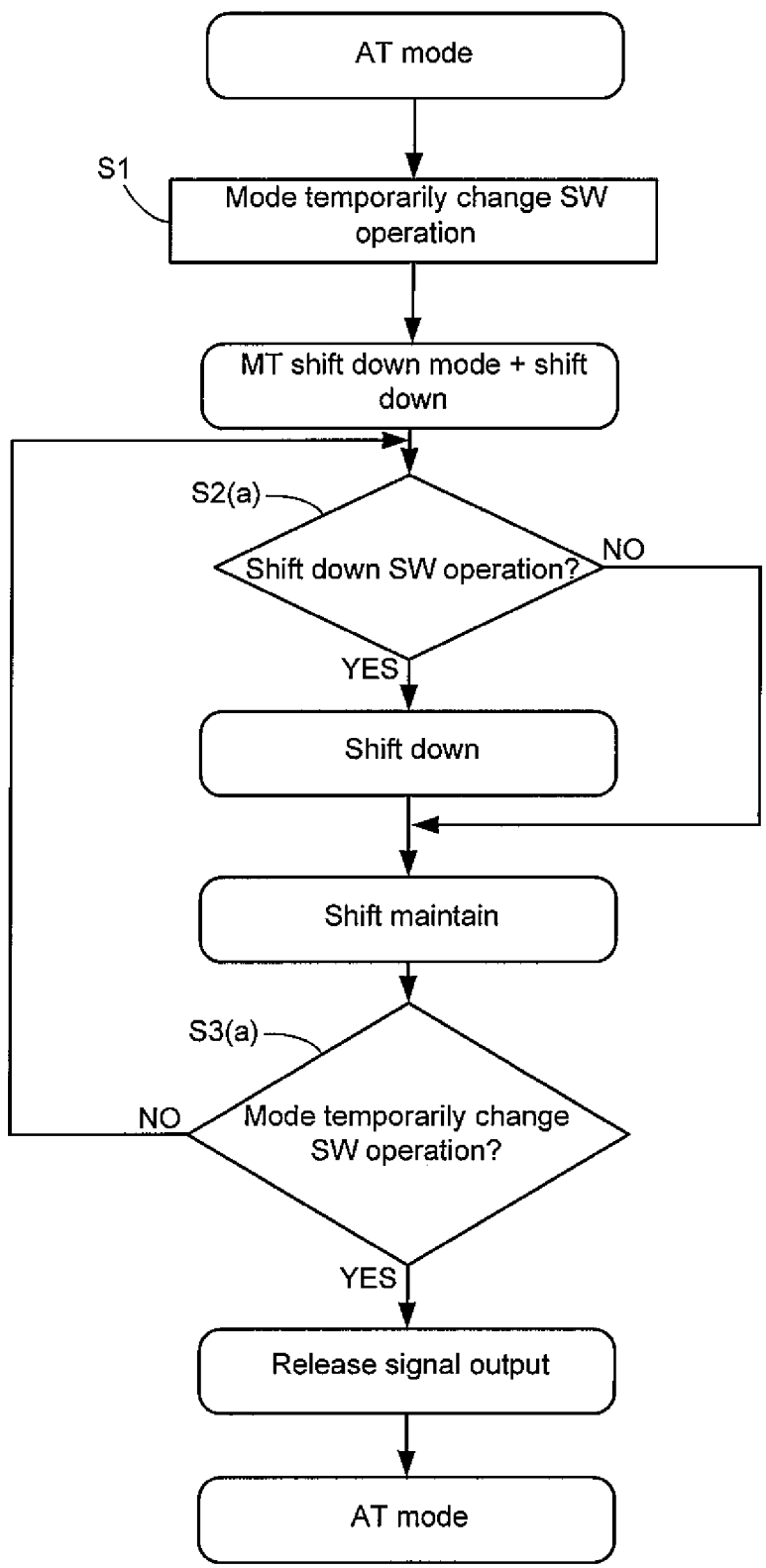
FIG. 14 is a flowchart of the MT shift down mode in a variation 1.

In the above embodiment, an example in which a further shift down operation is made following operation of mode temporarily changing switch 43 in MT shift down mode is described. However, as shown in FIG. 14, a further shift down operation can be made following an operation of shift down switch 42 by the rider, and the mode can return to AT mode following operation of mode temporarily changing switch 43 in MT shift down mode.

<Variation 2>

In the above embodiment, an example in which mode temporarily changing switch 43 is separately provided and the mode changes to MT shift down mode following operation of mode temporarily changing switch 43 is described. However, the invention is not limited to this construction. In variation 2, mode temporarily changing switch 43 is not separately provided and the mode changes to MT shift down mode following operation of shift down switch 42.

In the description of variation 2, FIG. 1 is referred to in common and the same components are assigned with the same numerals and/or symbols and further descriptions are omitted.

Figure 15:
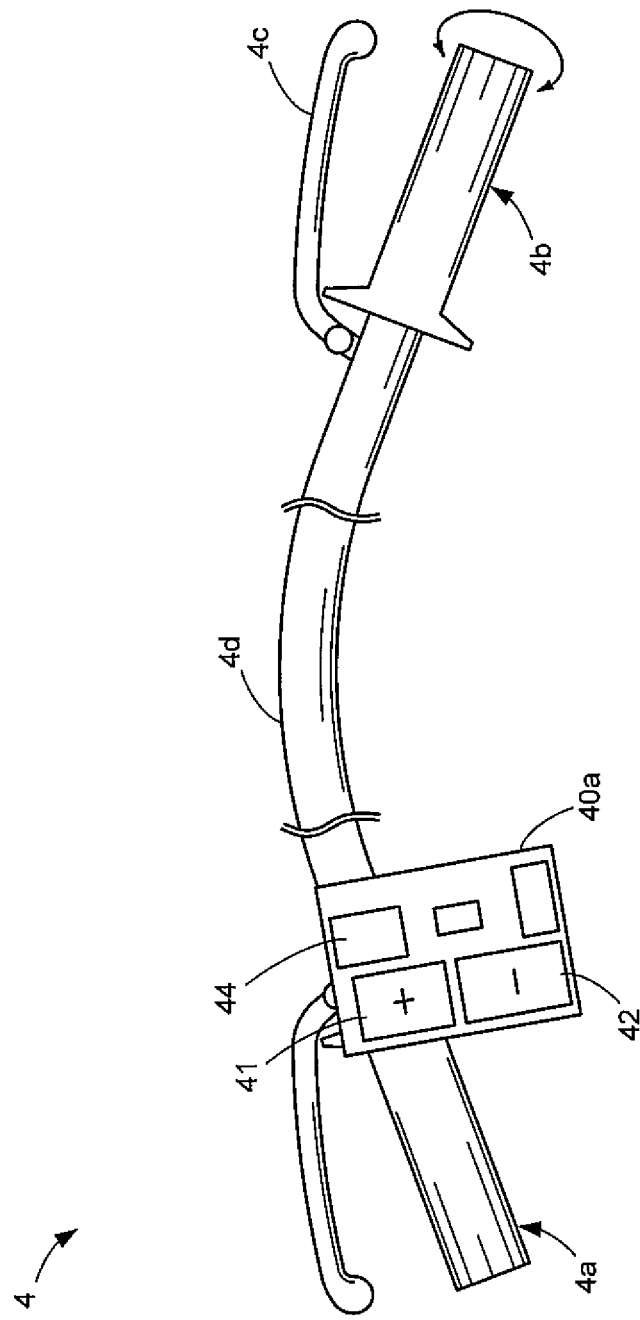
FIG. 15 is a schematic structural view of a steering handle in a variation 2.

FIG. 15 is a schematic structural view of a steering handle 4 portion in variation 2. Switch box 40a in variation 2 does not have mode temporarily changing switch 43. The left side of switch box 40a only has shift up switch 41 and shift down switch 42. Because the number of switches disposed in the left side portion of switch box 40a is relatively few, shift up switch 41 and shift down switch 42 are larger than those provided in the previously described embodiment.

The location of mode selecting switch 44 is not limited to left grip section 4a. For example, mode selecting switch 44 can be placed in a further switch box disposed on the left side of right grip section 4b. In this alternative, mode selecting switch 44 is preferably located for operation by the rider's right forefinger.

Figure 16:
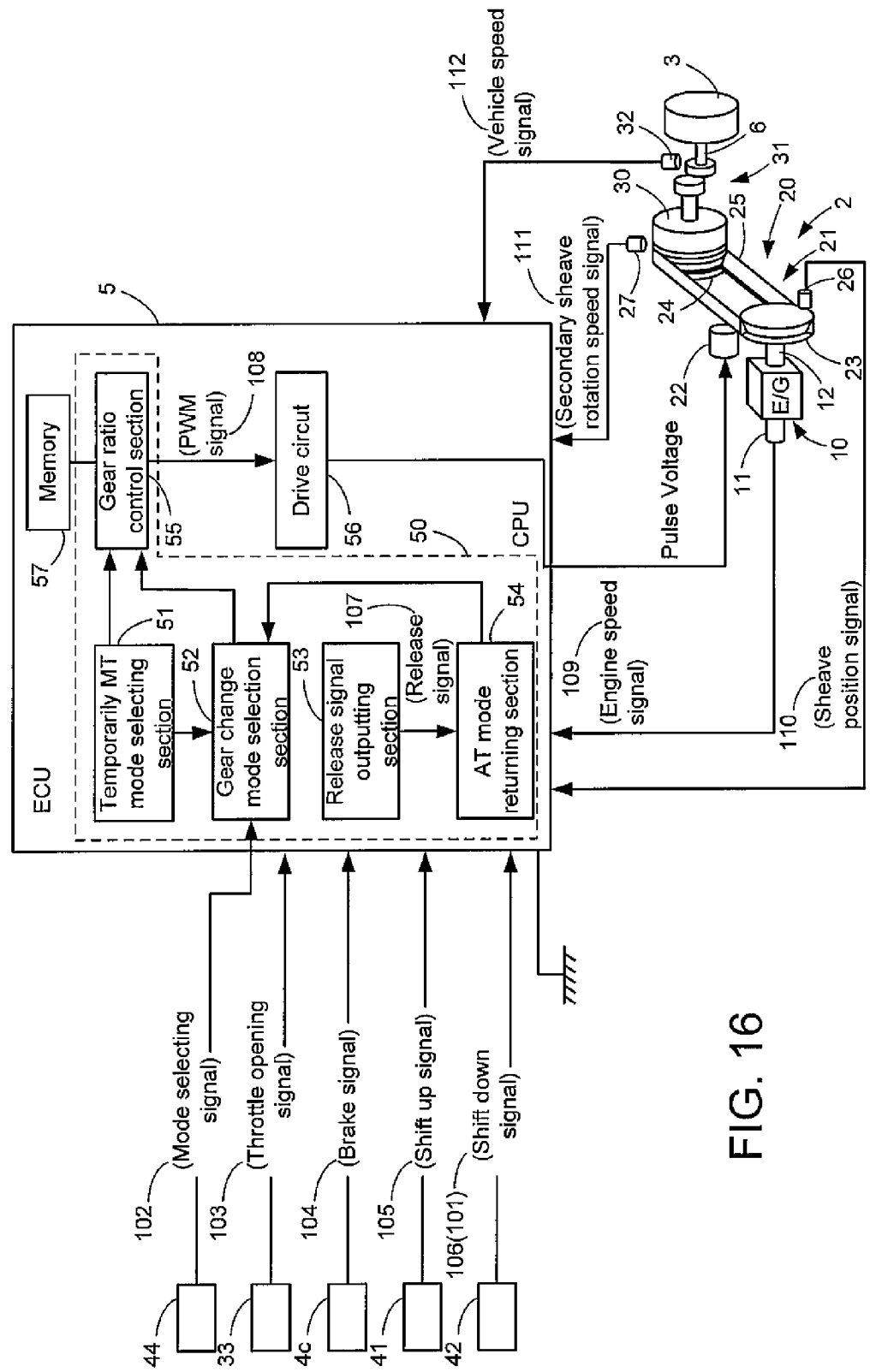
FIG. 16 is a block diagram of a control system in the variation 2.
Figure 17:
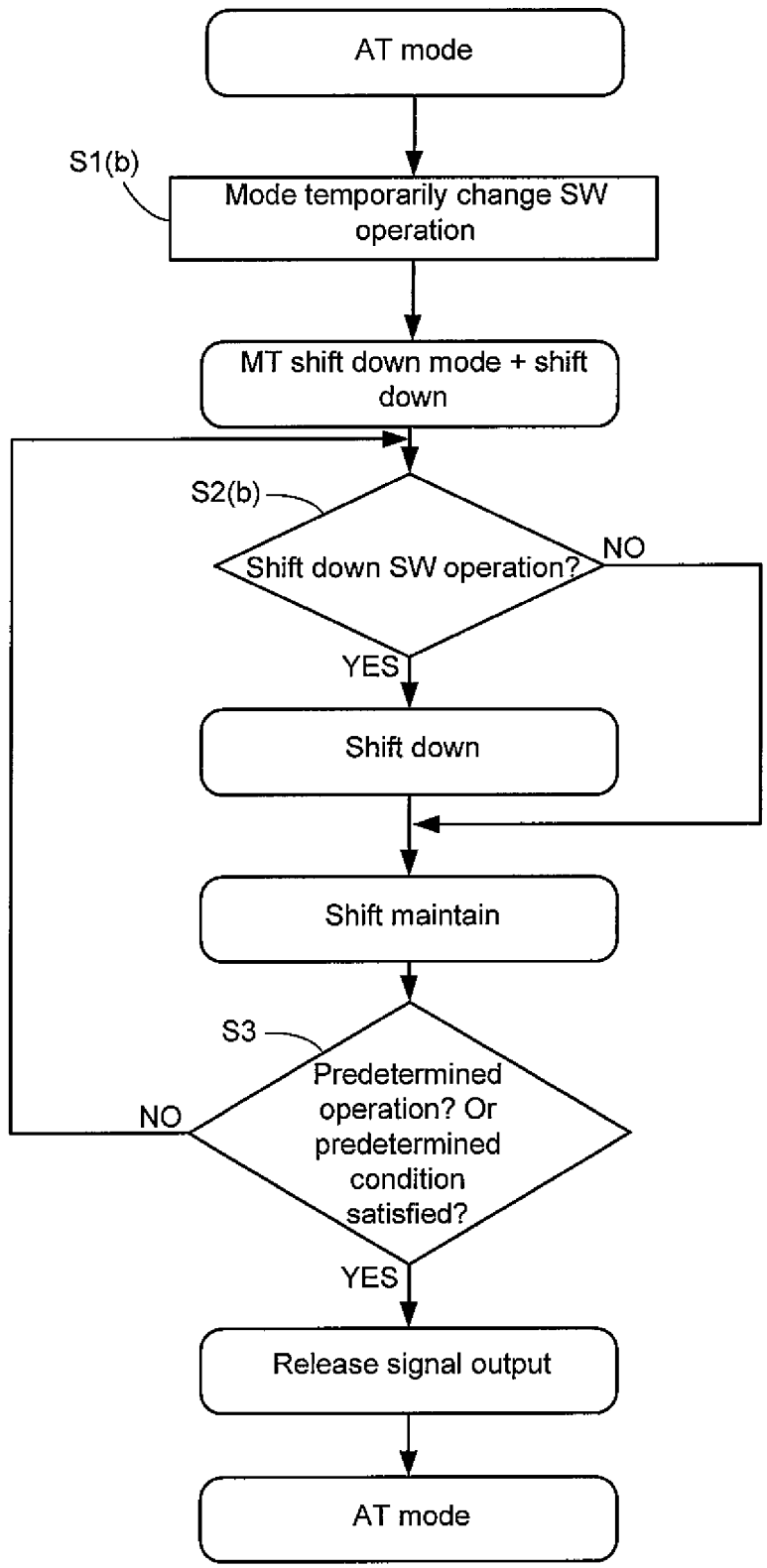
FIG. 17 is a flowchart of the MT shift down mode in the variation 2.

As shown in FIG. 16, in variation 2, shift down signal 106 outputted when shift down switch 42 is operated in AT mode is mode change signal 101. That is, as shown in FIG. 17, when shift down switch 42 is operated by the rider at step S1(b) in AT mode, shift down signal 106 functioning as mode change signal 101 is outputted to ECU 5. MT shift down mode is then selected by MT mode temporarily selecting section 51. Along with this selection, the gear ratio of transmission 20 is changed by gear ratio control section 55 to a gear ratio within the predetermined multiple gear ratios (first through fifth speeds) in a LOW range that is lower than the current gear ratio.

In variation 2, when shift down switch 42 is operated in MT shift down mode, the shift down operation is made (step S2(b)).

<<Action and Effect>>

In variation 2, following operation of shift down switch 42, the mode changes to MT shift down mode and a further shift down operation in MT shift down mode is made. Therefore, mode temporarily changing switch 43 is not necessary and shift up switch 41 and shift down switch 42 can be upsized. Operability for the rider is thereby enhanced and, because there are fewer operation switches, they are more easily operated.

<Variation 3>

Figure 18:
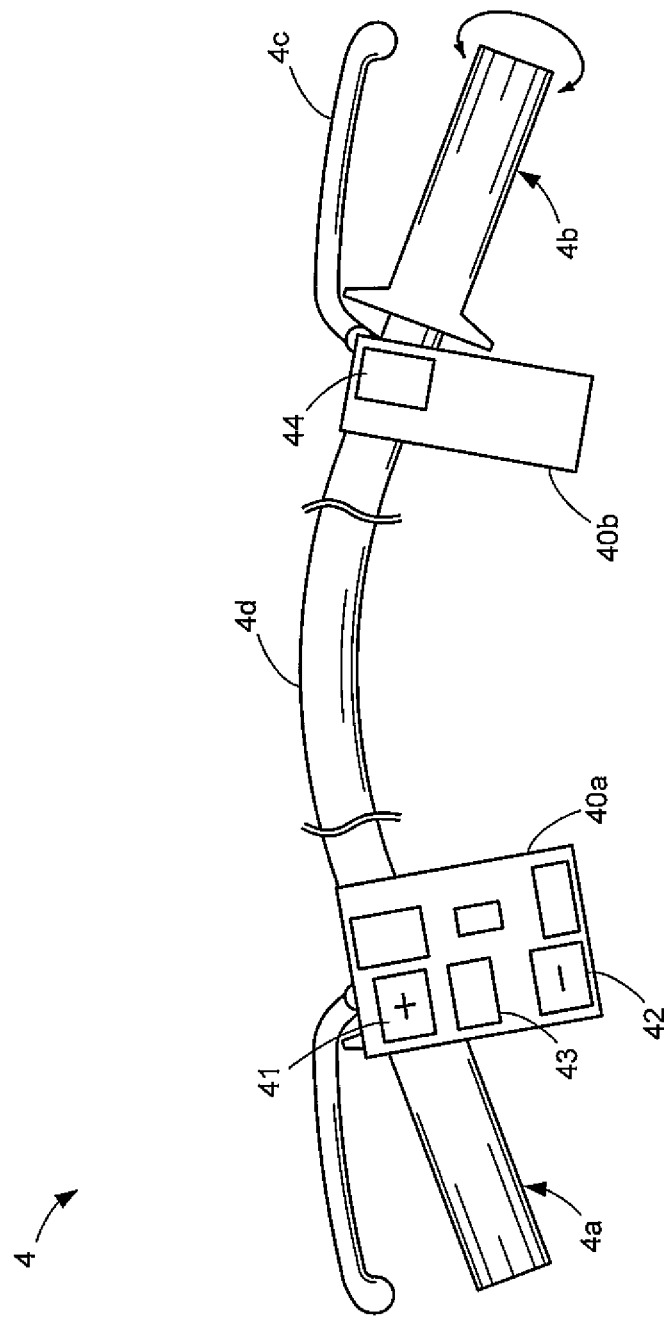
FIG. 18 is a schematic structural view of a steering handle in a variation 3.

In the above embodiment, an example in which mode selecting switch 44 is placed in switch box 40a disposed in left grip section 4a is described. However, the location of mode selecting switch 44 is not limited to left grip section 4a. For example, as shown in FIG. 18, mode selecting switch 44 can be placed in a further switch box 40b disposed in the left side of right grip section 4b. Mode selecting switch 44 is preferably located for operation by the rider's right forefinger.

<Other Variations>

In the above embodiment, a belt type ECVT is used. However, an ECVT other than a belt type can be used, such as a toroidal type ECVT.

In the above embodiment, a scooter type motorcycle 1 is described. However, the invention is not limited to motorcycle 1. The present invention includes, for example, so-called motorcycles, mopeds, off-road vehicles and ATVs (all terrain vehicles).

In the above embodiment, switches 41-44 are push type or button type switches. However, the switches may be push type levers or rotary type switches whose knobs are moved among multiple positions.

In the above embodiment, the gear ratio of transmission 20 is changed by gear ratio control section 55 to a gear ratio within the predetermined multiple gear ratios (first through fifth speeds) that is the closest to the current gear ratio and exists in a LOW range that is lower than the current gear ratio. However, the invention is not so limited. For example, the gear ratio can be changed to a gear ratio within the predetermined multiple gear ratios (first through fifth speeds) that is closer to the current gear ratio than the gear ratio existing in the LOW range that is lower than and closest to the current gear ratio. More specifically, the gear ratio can be changed to a gear ratio that is closer by one stage to the current gear ratio than the gear ratio existing in the LOW range that is lower than and closest to the current gear ratio. Furthermore, the gear ratio can be changed to a gear ratio that is closer by two stages to the current gear ratio than the gear ratio existing in the LOW range that is lower than and closest to the current gear ratio.

Alternatively, the rider can set shift down amounts. For example, the rider can select a mode having a large shift down amount for a relatively quick drive, or a mode having a small shift down amount for a relatively slow drive. Furthermore, multiple mode temporarily changing switches 43 can be provided. For example, one mode temporarily changing switch 43 whose shift down amount is relatively small and another whose shift down amount is relatively large can be provided.

In this embodiment, the actuator for changing the gear ratio of transmission 20 is described as motor 22 controlled by PWM. However, the invention is not limited to this type of actuator. For example, the actuator changing the gear ratio of transmission 20 can be an electric motor controlled by PAM (pulse amplitude modulation), a step motor or a hydraulic actuator.

In the above embodiment, both the automatic MT mode and manual MT mode are selectable. However, for example, a setting in which either one of the automatic MT mode and manual mode is selectable may be provided. Also, another setting in which both the automatic MT mode and manual MT mode are not selectable may be provided That is, a construction in which only AT mode and MT shift down mode are selectable without having mode selecting switch 44 may be provided. Furthermore, a setting in which gear change modes other than AT mode, automatic MT mode, manual MT mode and MT shift down mode are selectable may also be provided.

In the above embodiment, an example in which the mode changes to manual MT mode in MT shift down mode is described. However, the mode can change to automatic MT mode in MT shift down mode. That is, the gear ratio of transmission 20 may be automatically changed, after the mode changes to MT shift down mode, in accordance with the running states of motorcycle 1, without operation of the operation switch.

In the above embodiment, an example in which the gear change mode changes in turn whenever single mode selecting switch 44 is operated is described. Alternatively, for example, separate mode selecting switches for selecting AT mode, automatic MT mode and manual MT mode can be provided.

Embodiment 2

Figure 19:
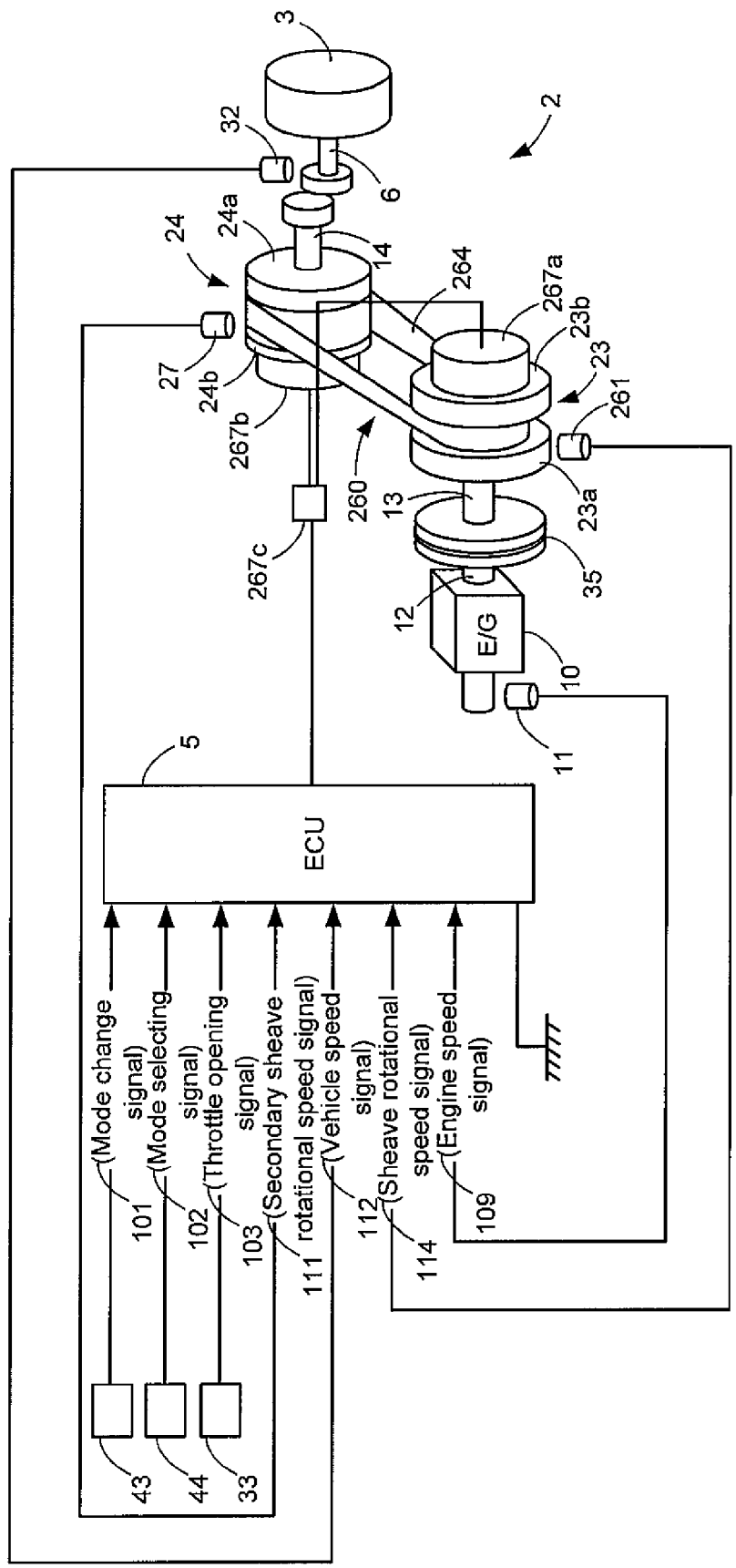
FIG. 19 is a block diagram of a control system in an embodiment 2.

As shown in FIG. 19, a transmission 260 having a metal V belt may be used in place of transmission 20 of the first embodiment. In FIG. 19, members or sections that perform the same operation as in FIG. 4 are indicated by the same reference numerals. In FIG. 19, the internal constitution of ECU 5 is the same as in the first embodiment, and is therefore not shown in FIG. 19.

In this embodiment, transmission 260 has several modifications in addition to a metal V belt 264.

Metal belt CVT 260 includes a clutch 35, a primary rotation sensor 261, a hydraulic cylinder 267A, 267B, and a hydraulic control valve 267C.

Clutch 35 is provided between output shaft 12 of engine 10 and input shaft 13 of metal belt CVT 260. Clutch 35 engages or disengages the power transmission between output shaft 12 of engine 10 and input shaft 13 of metal belt CVT 260. Clutch 35 is an electronically controlled multiplate clutch. Therefore, engagement or disengagement of clutch 35 is electronically controlled automatically. Driving force of engine 10 is transmitted to primary sheave 23 through clutch 35 when clutch 35 is engaged. Driving force transmitted to primary sheave 23 is transmitted to secondary sheave 24 through belt 264.

Primary rotational speed sensor 261 detects the rotational speed of primary sheave 23. Primary rotational speed sensor 261 outputs the detected rotational speed of primary sheave 23 to ECU 5 as a sheave rotational speed signal 114.

Primary sheave 23 and secondary sheave 24 have, respectively, fixed sheave halves 23a and 24a, and movable sheave halves 23b, 24b. Movable sheave half 23b moves in the axial direction of input shaft 13 of metal belt 260. Movable sheave half 24b moves in the axial direction of output shaft 14 of metal belt CVT 260.

Primary rotation sensor 261 detects the rotational speed of primary sheave 23. ECU 5 calculates the gear ratio of metal belt CVT 260 from the ratio between the rotational speed of primary sheave 23 detected by primary rotation sensor 261 and the vehicle speed of the straddle type vehicle detected by vehicle speed sensor 32. Specifically, the gear ratio of metal belt CVT 260 is calculated at ECU 5 by the ratio of sheave rotational speed signal 114 to vehicle speed signal 112. However, the gear ratio of metal belt CVT 260 may be calculated from the ratio between the rotational speed of primary sheave 23 detected by primary rotational sensor 261 and the rotational speed of secondary sheave 24 detected by secondary sheave rotational speed sensor 27. That is, the gear ratio of metal belt CVT 260 may be calculated at ECU 5 from the ratio of sheave rotational speed signal 114 to secondary sheave rotational speed signal 111.

Hydraulic cylinder 267A controls the groove width of primary sheave 23 by applying a pressure to movable sheave half 23b. Hydraulic cylinder 267B controls the groove width of secondary sheave 24 by applying a pressure to movable sheave half 24b. Hydraulic control valve 267C controls the hydraulic pressures applied to hydraulic cylinders 267A, 267B so that when the hydraulic pressure of one of hydraulic cylinders 267A and 267B is set higher, the hydraulic pressure of the other of hydraulic cylinders 267B and 267A is set lower. Hydraulic control valve 267C is controlled by ECU 5.

The gear ratio of metal belt CVT 260 is changed by control of hydraulic control valve 267C at ECU 5. ECU 5 is controlled in the same way as in the first embodiment. According to this embodiment, ECU 5 may set the rotational speed of primary sheave 23 instead of the engine speed as a control target value.

<Definitions of Terms and So Forth in this Specification>

The term "driving source" refers to a device that generates power. The "driving source" may be, for example, an internal combustion engine, an electric motor or the like.

The term "electronically controlled transmission" means a transmission in general whose gear ratio is changed by using electric power. The "electronically controlled transmission" includes a transmission whose gear ratio is changed by an electric motor and a transmission whose gear ratio is changed by an electronically controlled hydraulic actuator. That is, insofar as it is electronically controlled, the type of actuator for changing the gear ratio is not specifically limited.

The "push type switch" includes, for example, a lever type push type switch and a button type switch.

The "motorcycle" includes not only a motorcycle in a narrow sense but also, for example, a scooter and a so-called moped.

The present invention is useful for vehicles having an ECVT.

The invention claimed is:

1. A control system for an electronically controlled continuously variable transmission located between a driving source, and a driving wheel of a vehicle, the vehicle including a mode changing switch for outputting a mode change signal, the control system comprising:
a gear ratio control section for controlling a gear ratio of the transmission;
a gear change mode selecting section for selecting an AT mode in which the gear ratio control section changes the gear ratio continuously or an MT mode, including an MT shift down mode that enables shift down and disables shift up, in which the gear ratio control section changes the gear ratio among a plurality of predetermined gear ratios in accordance with a driving state of the vehicle;
a release signal outputting section for outputting a release signal in a case where a predetermined operation is made to the vehicle or in a case where a predetermined condition is satisfied in connection with the vehicle;
an MT shift down mode selecting section for making the gear change mode selecting section select the MT shift down mode when the mode change signal was inputted in the AT mode selected by the gear change mode selecting section and, at the same time, for making the gear ratio control section change the gear ratio to one of the gear ratios from among the plurality of the predetermined gear ratios that is lower than a current gear ratio; and
an AT mode returning section for returning the gear change mode selected by the gear change mode selecting section to the AT mode when the release signal is outputted after the MT shift down mode is selected by the MT shift down mode selecting section.

2. The control system according to claim 1, wherein the MT mode further comprises:
an automatic MT mode in which the gear ratio control section automatically changes a gear ratio of the transmission among the predetermined plurality of gear ratios in accordance with a driving state of the vehicle; and
a manual MT mode in which the gear ratio control section changes a gear ratio of the transmission among the predetermined plurality of gear ratios in accordance with an operation of a rider of the vehicle.

3. The control system according to claim 1, wherein the vehicle further includes
a throttle opening sensor for detecting a throttle opening,
a rotational speed sensor for detecting a rotational speed of the driving source, and
a vehicle speed sensor for detecting a vehicle speed, and
wherein the release signal outputting section outputs the release signal if at least one of the throttle opening, the rotational speed of the driving source, and the vehicle speed satisfies the predetermined condition.

4. The control system according to claim 1, wherein the predetermined condition is satisfied with the vehicle when a predetermined period elapses after the MT shift down mode is selected by the MT shift down mode selecting section.

5. The control system according to claim 1, wherein the vehicle further includes a brake, and the predetermined operation is made with the vehicle when the brake is operated.

6. The control system according to claim 1, further comprising:
a shift up switch for shifting up the transmission when the gear change mode selecting section selects the MT mode,
wherein the predetermined operation is made with the vehicle when the shift up switch is operated during a period in which the MT shift down mode is selected by the MT shift down mode selecting section.

7. The control system according to claim 1, wherein the predetermined condition is satisfied with the vehicle when the mode change signal is outputted by the mode changing switch after the MT shift down mode is selected by the MT shift down mode selecting section.

8. The control system according to claim 1, wherein the vehicle further includes a shift down switch for outputting a shift down signal, and
wherein the gear ratio control section changes the gear ratio of the transmission to one of the gear ratios positioned lower than a current gear ratio of the transmission among the plurality of predetermined gear ratios when the shift down signal is output while the MT shift down mode is selected by the MT shift down mode selecting section.

9. The control according to claim 1, wherein the gear ratio control section changes the gear ratio of the transmission to a gear ratio positioned lower than the current gear ratio from among the plurality of predetermined gear ratios, when the mode change signal is outputted during a period in which the MT shift down mode is selected by the MT shift down mode selecting section.

10. The control system according to claim 1, wherein the mode changing switch is a push type switch that outputs the mode change signal when pushed.

11. The control system according to claim 1, wherein the vehicle further includes a shift down switch for shifting down the transmission when the gear change mode selecting section selects the MT mode.

12. The control system according to claim 1, wherein the vehicle further includes a mode selecting switch for outputting a mode selecting signal, whereby the gear change mode selecting section selects one of the plurality of gear change modes.

13. A transmission including a continuously variable electronically controlled gear change mechanism located between a driving source and a driving wheel and a control system for controlling the gear change mechanism, the control system comprising:
a mode changing switch outputting a mode change signal to the control system;
a gear ratio control section for controlling the gear ratio of the gear change mechanism;
a gear change mode selecting section for selecting an AT mode in which the gear ratio control section changes the gear ratio of the gear change mechanism continuously or an MT mode, including an MT shift down mode that disables shift up, in which the gear ratio control section changes the gear ratio among a plurality of predetermined gear ratios in accordance with a driving state of the vehicle;
a release signal outputting section for outputting a release signal in a case where a predetermined operation is made to the vehicle or in a case where a predetermined condition is satisfied in connection with the vehicle;
an MT shift down mode selecting section for making the gear change mode selecting section select the MT shift down mode when the mode change signal is inputted in the AT mode selected by the gear change mode selecting section and, at the same time, for making the gear ratio control section change a gear ratio of the transmission to a gear ratio from among the plurality of predetermined gear ratios that is positioned lower than the current gear ratio; and an AT mode returning section for returning the gear change mode selected by the gear change mode selecting section to the AT mode when the release signal is outputted after the MT shift down mode is selected by the MT shift down mode selecting section.

14. A vehicle comprising:
a driving source;
a driving wheel driven by the driving source;
a transmission located between the driving source and the driving wheel and including a continuously variable electrically controlled gear change mechanism;
a control system for controlling the gear change mechanism; and
a mode changing switch for outputting a mode change signal to the control system, the control system including
a gear ratio control section for controlling the gear ratio of the gear change mechanism,
a gear change mode selecting section for selecting an AT mode in which the gear ratio control section changes the gear ratio of the gear change mechanism continuously or an MT mode, including an MT shift down mode that disables shift up, in which the gear ratio control section changes the gear ratio of the gear change mechanism among a plurality of predetermined gear ratios, in accordance with a driving state of the vehicle,
a release signal outputting section for outputting a release signal in a case where a predetermined operation is made to the vehicle or in a case where a predetermined condition is satisfied in connection with the vehicle,
an MT shift down mode selecting section for making the gear change mode selecting section select the MT shift down mode when the mode change signal is inputted in the AT mode selected by the gear change mode selecting section and, at the same time, for making the gear ratio control section change a gear ratio of the gear change mechanism to a gear ratio from among the plurality of predetermined gear ratios that is positioned lower than a current gear ratio, and
an AT mode returning section for returning the gear change mode selected by the gear change mode selecting section to the AT mode when the release signal is outputted after the MT shift down mode is selected by the MT shift down mode selecting section.

15. The vehicle according to claim 14, wherein the mode changing switch is located for operation by a rider's thumb.

16. The vehicle according to claim 14, further comprising: handlebars including right and left grips, wherein the mode changing switch is located on a right side of the left grip.

17. The control system according to claim 1, wherein the mode changing switch includes a plurality of mode changing switches that each outputs a different mode change signal when actuated,
each mode change signal corresponding to an amount to shift down by changing the gear ratio to one of the plurality of predetermined gear ratios that is lower than the current gear ratio,
each amount being different than the other amounts.

18. The control system according to claim 17, wherein the user sets one or more of the amounts before actuating the plurality of mode changing switches to output the mode changing signals.

* * * * *